United States Patent
Uehara et al.

(10) Patent No.: US 7,705,844 B2
(45) Date of Patent: Apr. 27, 2010

(54) IMAGE DISPLAY DEVICE, PORTABLE TERMINAL DEVICE, DISPLAY PANEL AND IMAGE DISPLAY METHOD USING THE SAME

(75) Inventors: Shin-ichi Uehara, Tokyo (JP); Naoyasu Ikeda, Tokyo (JP); Nobuaki Takanashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1765 days.

(21) Appl. No.: 10/787,101

(22) Filed: Feb. 27, 2004

(65) Prior Publication Data

US 2004/0169919 A1 Sep. 2, 2004

(30) Foreign Application Priority Data

Feb. 28, 2003 (JP) ............................. 2003-054714
Oct. 22, 2003 (JP) ............................. 2003-362482

(51) Int. Cl.
*G06T 15/00* (2006.01)

(52) U.S. Cl. ...................... 345/419; 345/6; 345/613; 353/7; 359/463; 348/59

(58) Field of Classification Search ............... 345/87, 345/6, 419, 613; 359/443, 458, 462, 463, 359/466; 353/7; 348/54, 59; 349/15
See application file for complete search history.

(56) References Cited

U.S. PATENT DOCUMENTS 7,091,652 B2 * 8/2006 Morley et al. ............... 313/110
7,113,231 B2 * 9/2006 Conner et al. ................... 349/5

FOREIGN PATENT DOCUMENTS

| JP | 9-164253 A | 6/1997 |
| JP | 10-253926 A | 9/1998 |
| JP | 63248293 A | 10/1998 |
| JP | 2000-78617 A | 3/2000 |
| JP | 2000-102038 A | 4/2000 |
| JP | 2001-83456 A | 3/2001 |
| JP | 2001-91896 A | 4/2001 |
| JP | 2001-506435 A | 5/2001 |
| JP | 2001-159743 A | 6/2001 |
| JP | 2001-183604 A | 7/2001 |
| JP | 2002-40956 A | 2/2002 |

OTHER PUBLICATIONS

Chihiro Masuda, "Three-Dimensional Display", Sangyo Tosho, K.K. Nikkei Electronics, No. 838, p. 26-27, Jan. 6, 2003.

* cited by examiner

*Primary Examiner*—Abbas I Abdulselam
(74) *Attorney, Agent, or Firm*—Sughrue Mion, PLLC

(57) ABSTRACT

A three-dimensional image/two-dimensional image display device includes a plurality of display pixels, and a lenticular lens for three-dimensional display. Each display pixel is consisted of M×N number of sub-pixels to be viewed from N view points. A pitch a of sub-pixels arranged in the longitudinal direction of ridge projection of the lenticular lens and a pitch b of the sub-pixels arranged in a direction orthogonal to the longitudinal direction of the lenticular lens satisfy the following expression. The M×N number of sub-pixels included in each of said display pixels are formed within a square area.

a:b=N:1

44 Claims, 27 Drawing Sheets

IMAGE DISPLAY DEVICE, PORTABLE TERMINAL DEVICE, DISPLAY PANEL AND IMAGE DISPLAY METHOD USING THE SAME

BACKGROUND OF THE INVENTION

1. Technical Field of the Invention

The present invention relates to an image display device which is capable of individually displaying images that are to be viewed from a plurality of view points and displaying an image without reducing resolution when images different from one another are viewed from the plurality of view points, a portable terminal device incorporating therein such image display device, a display panel incorporated within the image display device, and an image display method. Particularly, the present invention relates to an image display device capable of displaying a three-dimensional image without reducing resolution, displaying a two-dimensional image and three-dimensional image with the same resolution, and further, displaying a two-dimensional image and three-dimensional image at any location in a blended fashion, a portable terminal device incorporating therein such image display device, a display panel incorporated within the image display device, and an image display method using the same.

2. Description of the Related Art

Conventionally, a display device has been studied which is capable of displaying a three-dimensional image. In 280 years B.C., Greece-mathematician Euclid considered and defined "binocular vision is what a person perceives when he/she sees, using his/her right and left eyes one at a time, different images of the same object that are created when viewed from different directions" (non-patent literature 1: Chihiro Masuda, "Three-Dimensional Display" Sangyo Tosho, K.K.). That is, a three-dimensional display device should have a capability to distribute images with parallax to right and left eyes, respectively.

A number of three-dimensional image display methods have conventionally been studied and developed as a method for realizing the above-stated capability and those methods can be classified mainly into two types of methods, i.e., a method using eyeglasses and a method not using eyeglasses. One of methods of the type using eyeglasses would be an anaglyph method using difference in color, a polarized eyeglasses method using polarization, or the like. However, in the method using eyeglasses, a user of eyeglasses basically cannot remove the burden of wearing eyeglasses and in consideration of such problems, non-eyeglasses observing, which is performed by not using eyeglasses, has intensely been studied and developed in recent years. The non-eyeglasses observing includes, for example, a method using a lenticular lens and a method using a parallax barrier.

The parallax barrier method was conceived by Berthier in 1896 and identified by Ives as practical in 1903. FIG. 1 shows an optical model illustrating a three-dimensional image display method using a parallax barrier. As shown in FIG. 1, a parallax barrier 105 is a barrier (light shield) which has a number of fine vertical-striped openings, i.e., slits 105a formed therein. Furthermore, disposed in the vicinity of one surface of the parallax barrier 105 is a display panel 106. In the display panel 106, pixels 123 for right eye and pixels 124 for left eye are arranged in a direction orthogonal to the longitudinal direction of the slits. Moreover, disposed in the vicinity of the other surface of the parallax barrier 105, i.e., on the side opposite the display panel 106 is a light source 108.

Lights were emitted from the light source 108 and have transmitted through the openings (slits 105a) of the parallax barrier 105 and then through the pixels 123 for right eye, thereby flowing out as light fluxes 181. Similarly, lights were emitted from the light source 108 and have transmitted through the slits 105a and then through the pixels 124 for left eye, thereby flowing out as light fluxes 182. In this case, the location of an observer who is able to identify a three-dimensional image is determined by a positional relationship between the parallax barrier 105 and the pixels. That is, it is required that a right eye 141 of the observer 104 falls within an area through which all of the light fluxes 181 corresponding to a plurality of pixels 123 for right eye pass and a left eye 142 of the observer 104 falls within an area through which all of the light fluxes 182 corresponding to a plurality of pixels 124 for left eye pass. As shown in FIG. 1, this positional relationship between the eyes and the light fluxes corresponds to the case where a midpoint 143 between the right eye 141 and left eye 142 of the observer falls within a quadrangle shaped three-dimensional visible range 107 shown in FIG. 1. Among line segments extending in a direction along which the pixels 123 for right eye and pixels 124 for left eye are arranged in the three-dimensional visible range 107, a line segment passing through a intersection 107a of diagonal lines in the three-dimensional visible range 107 is longest. Accordingly, in case of the midpoint 143 being positioned at the intersection 107a, a latitude of a displacement which is allowed when the position of the observer is displaced in a right or left direction becomes maximum and therefore, when the midpoint 143 is positioned at the intersection 107a, it can be concluded that the observer views images from a most preferable position. In consideration of the above-described fact, it is recommended that the three-dimensional image display method is constructed such that when assuming a distance between the intersection 107a and the display panel 106 is an optimal observation distance OD, the observer views images keeping the distance OD from the display panel. Note that a virtual plane spaced apart from the display panel 106 the optimal observation distance OD in the three-dimensional visible range 107 is referred to as an optimal observation plane 107b. This allows lights from the pixels 123 for right eye and the pixels 124 for left eye to reach the right eye 141 and left eye 142 of the observer, respectively. Therefore, it becomes possible that the observer identifies an image displayed on the display panel 106 as a three-dimensional image.

At the beginning of emergence of the method using a parallax barrier, the parallax barrier was disposed between pixels and eyes, and therefore, a problem arises in that the parallax barrier obstructs the view and serves to cause the visibility of an image to be displayed to be low. However, the recent commercialization of a liquid crystal display panel makes it possible to dispose the parallax barrier 105 on the rear side of the display panel 106 to improve the visibility of an image to be displayed. This currently leads to enhancement of the study and development of a three-dimensional image display device using a parallax barrier.

An example of a product which uses a parallax barrier and became a commercial reality is described in a table 1 of Nikkei Electronics, No. 838, pp. 26-27 issued on Jan. 6, 2003 (non-patent literature 2). This product is a cellular phone incorporating therein a 3D (three-dimensional) liquid crystal display panel and the liquid crystal display panel making up a three-dimensional image display device is 2.2-inch diagonal in size and has 176 columns of 220 dots as a display dot. Furthermore, a liquid crystal display panel for switching between on and off of effect of parallax barrier is provided allowing a display on the panel to switch between three-dimensional display and two-dimensional display. Although the display device displays a two-dimensional image with a definition of 128 dpi in both vertical and horizontal directions, at the time of display of three-dimensional image, the display device displays images for left eye and images for right eye in a vertical stripe form and in an alternate fashion, and therefore, the display device displays the image with a definition of 64 dpi in a horizontal direction, which definition is half the definition, 128 dpi, in a vertical direction.

Furthermore, the method using a lenticular lens is invented by Ives et al. in around 1910, as described in, for example, the aforementioned non-patent literature 1. FIG. 2 is a perspective view illustrating a lenticular lens and FIG. 3 shows an optical model illustrating a three-dimensional display method using a lenticular lens. As shown in FIG. 2, a lenticular lens 121 is constructed such that one surface of the lens is planarized to provide a plane and the other surface thereof has formed therein a plurality of hog-backed projections (cylindrical lens 122), each extending in one direction, so that the longitudinal directions of the projections are parallel to one another.

Moreover, as shown in FIG. 3, a three-dimensional image display device of the type using a lenticular lens is configured so that a lenticular lens 121, a display panel 106 and a light source 108 are arranged in this order when viewed by an observer, and pixels of the display panel 106 are positioned on a focal plane of the lenticular lens 121. The display panel 106 is constructed such that pixels 123 for display of an image for right eye 141 and pixels 124 for display of an image for left eye 142 are arranged in an alternate fashion. In this case, individual sets of the pixel 123 and pixel 124, those pixels being adjacent each other, are provided so as to correspond to the cylindrical lenses (projections) 122 of the lenticular lens 121, respectively. This allows light emitted from the light source 108 and having transmitted through the individual pixels to be distributed by the cylindrical lenses 122 of the lenticular lens 121 in directions toward left and right eyes. Thus, it becomes possible for the left and right eyes to identify images different from each other, thereby allowing an observer to identify a three-dimensional image.

Whereas the method using a parallax barrier is the method for "shielding" unnecessary light rays by using a barrier, the method using a lenticular lens is the method for changing a direction in which light propagates and therefore it can be concluded that providing the lenticular lens theoretically never reduces the brightness of display screen. Accordingly, application of the method using a lenticular lens to a portable device etc. whose ability to display images with high brightness and operate with low power is regarded as particularly important is promising.

An example of a three-dimensional image display device developed using a lenticular lens is described in the above-stated non-patent literature 2. A liquid crystal display panel making up a three-dimensional image display device is 7-inch diagonal in size and has 800 columns of 480 dots as a display dot. Furthermore, changing a distance between a lenticular lens and a liquid crystal display panel by 0.6 mm allows switching between three-dimensional display and two-dimensional display. The number of view points arranged in a horizontal direction is five and when an observer changes his/her viewing angle in a horizontal direction, he/she can view five different images. That is, a display definition achieved at the time of display of three-dimensional image is reduced to one fifth of a display definition achieved at the time of display of two-dimensional image.

Furthermore, a simultaneous multiple-image display for simultaneously displaying multiple images has been developed as an image display device using a lenticular lens (for example, refer to the patent literature 1: Japanese Patent Laid-Open Publication No. H06(1994)-332354 (FIG. 13)). This display is configured so that through use of lenticular lens ability to distribute images, images different from one another when viewed from different directions are simultaneously displayed under the same conditions. This allows a single simultaneous multiple-image display to simultaneously provide a plurality of observers, who are positioned in directions different from one another relative to the display, with images different from one another. The patent literature 1 discloses that when using the simultaneous multiple-image display, saving of space for arrangement of displays and reduction in electricity expense are achieved, but those beneficial effects cannot be obtained in the case where a number of displays corresponding to the number of observers are prepared.

However, the aforementioned conventional techniques have the following problems. That is, when displaying images different from one another so that the images are viewed from a plurality of view points, the resolution of individual images to be displayed is disadvantageously reduced. Particularly, the resolution of an image to be displayed is reduced to a greater extent at the time of display of three-dimensional image than at the time of display of two-dimensional image. FIG. 4 is a top view illustrating sub-pixels in the aforementioned three-dimensional image display device using the parallax barrier and allowing view from two view points. One display pixel to be used at the time of display of three-dimensional image is comprised of two display pixels to be used at the time of display of two-dimensional image. At the time of display of three-dimensional image, the two display pixels serve as a pixel for left eye and a pixel for right eye to allow the display device to display an image for left eye and an image for right eye, respectively. The pixel for left eye and the pixel for right eye each are comprised of three primary color sub-pixels with primary colors, red, blue and green, and three slit openings correspond to one display pixel. In more detail, the red sub-pixel 411 for left eye and the green sub-pixel 422 for right eye correspond to a first slit opening. Furthermore, the blue sub-pixel 413 for left eye and the red sub-pixel 421 for right eye correspond to a second slit opening. Still furthermore, the green sub-pixel 412 for left eye and the blue sub-pixel 423 for right eye correspond to a third slit opening. Note that the individual sub-pixels are partitioned by a light shield section 6. When assuming a pitch of primary color sub-pixels arranged in the longitudinal direction (vertical direction 11) of slit opening is a and a pitch of the primary color sub-pixels arranged in a direction (horizontal direction 12) orthogonal to the longitudinal direction of slit opening is b, the following expression 1 results.

$$a:b=3:1 \qquad \text{(Expression 1)}$$

As a result, a relationship between a pitch a of display pixels arranged in the longitudinal direction of slit opening and a pitch c of the display pixels arranged in a direction orthogonal to the longitudinal direction of slit opening is represented by the following expression 2. That is, when a three-dimensional image is displayed by the three-dimensional image display device shown in FIG. 4, the size of one display pixel is represented by a in the longitudinal direction of slit opening and by c in the direction orthogonal to the longitudinal direction.

$$a:c=1:2 \qquad \text{(Expression 2)}$$

On the other hand, when a two-dimensional image is displayed by the three-dimensional image display device shown in FIG. 4, the parallax barrier 105 is removed and the one display pixel to be used at the time of display of three-dimensional image is used as two display pixels. Note that a method for removing a parallax barrier includes, for example, constructing a parallax barrier by a liquid crystal display panel for switching between on and off of effect of parallax barrier, as shown in the aforementioned non-patent literature 2, and changing light transmittance of individual elements of the liquid crystal display panel. Furthermore, when a lenticular lens is used instead of parallax barrier, changing a distance between the display panel and the lenticular lens allows elimination of effects of the lenticular lens.

In more detail, at the time of display of two-dimensional image, as shown in FIG. 4, three sub-pixels, i.e., the red sub-pixel 411 for left eye, green sub-pixel 422 for right eye and blue sub-pixel 413 for left eye, are used as one display pixel and three sub-pixels, i.e., the red sub-pixel 421 for right eye, green sub-pixel 412 for left eye and blue sub-pixel 423 for right eye, are used as one display pixel. As a result, the size of one display pixel is represented by a in the longitudinal direction of slit opening and by (c/2) in the direction orthogonal to the longitudinal direction. Therefore, it turns out that the pitch, used at the time of display of three-dimensional image, of the pixels arranged in the direction orthogonal to the longitudinal direction of slit opening becomes twice the pitch, used at the time of display of two-dimensional image, of the pixels arranged in the same direction. Accordingly, as is the case with the three-dimensional image display device described in the aforementioned non-patent literature 1, the resolution of an image to be displayed at the time of display of three-dimensional image in the horizontal direction 12 is reduced to half the resolution of an image to be displayed at the time of display of two-dimensional image.

The reduction in the resolution of an image to be displayed becomes problematic particularly when a three-dimensional image is displayed together with character information and when character information is three-dimensionally displayed. Since the display pixel is caused to take a shape of a rectangle with a 1:2 aspect ratio, the resolution in a horizontal direction is reduced and lack is generated in a vertical line making up a character when the character is displayed. As a result, the visibility of a character to be displayed is reduced to a large extent. This problem becomes more prominent as the number of view points increases.

Problems similar to those described above are not limited to a three-dimensional image display device, but generally observed in the display device for displaying images so that the images are viewed from a plurality of view points. That is, when displaying images so that the images are viewed from a plurality of view points different from one another; the resolution of images arranged in a direction in which sub-pixels that are to be viewed from a plurality of view points are arranged is reduced to an extent larger than the resolution achieved at the time of display of a single image and especially when a character is displayed together with the images to be viewed from a plurality of view points, the visibility of character is disadvantageously and significantly reduced.

Furthermore, a problem arises in that when using the conventional techniques relating to the aforementioned three-dimensional image display device, switching between three-dimensional display and two-dimensional display is performed all over the screen and therefore it is impossible that a three-dimensional image and a two-dimensional image are displayed on any location in a blended fashion.

SUMMARY OF THE INVENTION

It is an object of the present invention to provide an image display device which is capable of displaying an image without reducing resolution when images different from one another are viewed from a plurality of view points, particularly when a three-dimensional image is displayed, displaying a character with high visibility, displaying a two-dimensional image and three-dimensional image with the same resolution, and displaying a three-dimensional image and two-dimensional image at any position in a blended fashion, a portable terminal device incorporating therein such image display device, a display panel incorporated within the image display device, and an image display method using the same.

An image display device according to the first aspect of the present invention comprises: a display panel which is to be viewed from N number of view points and includes a plurality of display pixels arranged in a matrix, each display pixel having M×N (M and N each represent a natural number) number of sub-pixels, said M×N number of sub-pixels included in each of said display pixels being formed within a square area; and a lenticular lens for distributing light rays from said sub-pixels individually to said view points.

In the invention, the M×N number of sub-pixels included in one of the plurality of display pixels are formed within a square area. Therefore, the display pixel allows images to be independently viewed from the N view points. Furthermore, if N is not less than 2, an image for right eye and an image for left eye can be distributed to view points different from each other, allowing display of three-dimensional image. In this case, the display pixel is caused to take a shape of square. Additionally, when the same image is displayed by the N number of sub-pixels, in other words, the N number of sub-pixels making up one display pixel are operated to emit lights with the same intensity, the image display device, comprising such N number of sub-pixels, in its entirety is able to display a two-dimensional image. In this case, the resolution of the image is the same as that achieved when a three-dimensional image is displayed and the display pixel is caused to take a shape of square. In this way, in the invention, since resolutions achieved at the time of display of three-dimensional image and at the time of display of two-dimensional image can be made equal to each other, displaying a three-dimensional image and two-dimensional image in a blended fashion never causes an observer to feel uncomfortable, allowing a three-dimensional image to be displayed in any place where a two-dimensional image is to be displayed. Furthermore, since the display pixel can be caused to take a shape of square, an image is displayed with high visibility and particularly, a character is displayed with high visibility. Likewise, also when two-dimensional images different from one another are displayed as images viewed from N view points, the display pixel can be caused to take a shape of square, preventing reduction in the resolution of each of the two-dimensional images and improving especially the visibility of a character to be displayed.

Furthermore, the above-described display panel is a monochrome display panel and M represents 1, and when assuming a pitch of sub-pixels arranged in a longitudinal direction along a ridge projection of the lenticular lens is a and a pitch of the sub-pixels arranged in a direction orthogonal to the longitudinal direction of the lenticular lens is b, those pitches may satisfy the following expression 3, $a:b=N:1$         (Expression 3)

Alternatively, the display panel is a color display panel comprising sub-pixels of three primary colors and M represents 3, and when assuming a pitch of the sub-pixels arranged in a longitudinal direction along a ridge projection of the lenticular lens is a and a pitch of the sub-pixels arranged in a direction orthogonal to the longitudinal direction of the lenticular lens is b, those pitches may satisfy the following expression 4.

$$a:b=3\times N:1 \quad \text{(Expression 4)}$$

As described above, since each of the display pixels has sub-pixels of three primary colors, a color display can be made.

Alternatively, the display panel is a color display panel comprising sub-pixels of three primary colors and M represents 3, and wherein when assuming a pitch of the sub-pixels arranged in a longitudinal direction along a ridge projection of the lenticular lens is a and a pitch of the sub-pixels arranged in a direction orthogonal to the longitudinal direction of a ridge projection of the lenticular lens is b, those pitches may satisfy the following expression 5.

$$a:b=N:3 \quad \text{(Expression 5)}$$

Accordingly, three sub-pixels are arranged in the longitudinal direction of the lenticular lens and N number of sub-pixels are arranged in a direction orthogonal to the longitudinal direction, meaning that the sub-pixels can be arranged in a distributed fashion in vertical and horizontal directions of the display device. As a result, the density of pixels in the horizontal direction of the display device is reduced, advantageously allowing the display device to easily be manufactured.

An image display device according to the second aspect of the present invention comprises: a display panel which is to be viewed from N number of view points and includes a plurality of display pixels, each including N (N represents a natural number) number of sub-pixels; and a lenticular lens. Said image display device is further constructed such that when assuming a pitch of a lens array in said lenticular lens is L, a pitch of said sub-pixels of said display pixel is P, a pitch of said sub-pixels arranged in a longitudinal direction along a ridge projection of said lenticular lens is a, and a pitch of said sub-pixels arranged in a direction orthogonal to said longitudinal direction of said lenticular lens is b, said pitches satisfy the following expression 6.

$$a:b=L:P \quad \text{(Expression 6)}$$

In the invention, since the display pixel has the shape defined by the above-described expression 6, the display pixel appears as a precise square when viewed through the lenticular lens. Furthermore, if N is not less than 2, an image for right eye and an image for left eye can be distributed to view points different from each other, allowing display of three-dimensional image. Moreover, when the same image is displayed by the N number of sub-pixels, in other words, the N number of sub-pixels making up one display pixel are operated to emit lights with the same intensity, a two-dimensional image can be displayed as a whole by the image display device. In this way, since resolutions achieved at the time of display of three-dimensional image and at the time of two-dimensional image can be made equal to each other, displaying a three-dimensional image and two-dimensional image in a blended fashion never causes an observer to feel uncomfortable, allowing a three-dimensional image to be displayed in any place where a two-dimensional image is to be displayed. Furthermore, since the display pixel is allowed to appear as a precise square, an image is displayed with high visibility and particularly, a character is displayed with high visibility. Likewise, also when two-dimensional images different from one another are displayed as images to be viewed from N view points, the display pixel can be caused to take a shape of square, preventing reduction in the resolution of each of the two-dimensional images and improving especially the visibility of a character to be displayed.

An image display device according to the third aspect of the present invention comprises: a display panel which is to be viewed from N number of view points and includes a plurality of display pixels, each including 3×N (N represents a natural number) number of primary color sub-pixels; and a lenticular lens. Said image display device is further constructed such that when assuming a pitch of a lens array in said lenticular lens is L, a pitch of said sub-pixels of said display pixel is P, a pitch of said sub-pixels arranged in a longitudinal direction along a ridge projection of said lenticular lens is a, and a pitch of said sub-pixels arranged in a direction orthogonal to said longitudinal direction of said lenticular lens is b, said pitches satisfy the following expression 7.

$$a:b=3\times L:P \quad \text{(Expression 7)}$$

In the invention, the display pixel is allowed to appear as a precise square and further a color image can be displayed.

An image display device according to the fourth aspect of the present invention comprises: a display panel which is to be viewed from N number of view points and includes a plurality of display pixels, each including 3×N (N represents a natural number) number of primary color sub-pixels; and a lenticular lens. Said image display device is further constructed such that when assuming a pitch of a lens array in said lenticular lens is L, a pitch of said sub-pixels of said display pixel is P, a pitch of sub-pixels arranged in a longitudinal direction along a ridge projection of said lenticular lens is a, and a pitch of said sub-pixels arranged in a direction orthogonal to said longitudinal direction of said lenticular lens is b, said pitches satisfy the following expression 8.

$$a:b=L/3:P \quad \text{(Expression 8)}$$

In the invention, since the pitch of the sub-pixels arranged in the longitudinal direction of the lenticular lens is L, the display pixel can be caused to take a shape of perfect square. Furthermore, a color image can be displayed. Moreover, three display pixels are arranged in the longitudinal direction of the lenticular lens and N number of display pixels are arranged in a direction orthogonal to the longitudinal direction, meaning that the display pixels can be arranged in a distributed fashion in vertical and horizontal directions of the display device. As a result, the density of pixels in the horizontal direction of the display device is reduced, advantageously allowing the display device to easily be manufactured.

Additionally, the above-described primary color sub-pixels having the same color may be arranged in a direction orthogonal to the longitudinal direction of the lenticular lens.

Alternatively, in the image display device according to the invention, a set of three sub-pixels having the same relative positional relationship to a central axis of the lenticular lens and positioned adjacent one another may constitute primary color sub-pixels with primary colors, red, blue and green.

In the invention, the primary color sub-pixels are arranged not in a stripe pattern but in a mosaic pattern, allowing the display device to be suited to display an image of natural scene, etc.

Furthermore, in the image display device according to the invention, a focal distance of the lenticular lens and a distance between an apex of the lens and the pixel may be different from each other. This causes light emitted from the lenticular lens to reach an observer in a spread fashion. As a result, the degree to which the display device is influenced by a light shield section can be reduced. This prevents view of two-dimensional image from an area in which illuminance is reduced, allowing the resulting quality of a two-dimensional image to be displayed to be increased.

Still furthermore, the longitudinal direction along the ridge projection of the lenticular lens may be a horizontal direction of an image to be displayed. This means that when the image display device is incorporated within a portable terminal device, only changing the angle of the portable terminal device allows an observer to view the image display device from a plurality of view points different from one another, enabling the observer to view a plurality of images. Particularly, when the plurality of images are associated with one another, the observer is able to view the individual images simply by changing a viewing angle and therefore the portable terminal device becomes highly convenient for the observer. Moreover, since the plurality of view points are arranged in the vertical direction of the images, the observer is able to view the individual images through his/her both eyes without fail, allowing the visibility of the individual images to be enhanced An image display device according to the fifth aspect of the present invention comprises: a display panel which is to be viewed from N number of view points and includes a plurality of display pixels arranged in a matrix, each display pixel having M×N (M and N each represent a natural number) number of sub-pixels, said M×N number of sub-pixels included in each of said display pixels being formed within a square area; and a parallax barrier for distributing light rays from said sub-pixels individually to said view points.

In the invention, although the use of lenticular lens causes reduction in the quality of an image to be displayed, the use of parallax barrier prevents occurrence of reduction in the quality of an image to be displayed, which reduction is due to a pattern in the lens.

Moreover, the longitudinal direction of a slit opening in the parallax barrier may be a horizontal direction of an image to be displayed. This means that when the image display device is incorporated within a portable terminal device, only changing the angle of the portable terminal device allows an observer to view a plurality of images from a plurality of view points different from one another.

The portable terminal device according to the invention may be a cellular phone, portable terminal, PDA, game machine, digital camera or digital video camera.

A display panel according to the sixth aspect of the present invention comprises a plurality of display pixels arranged in a matrix, each display pixel being to be viewed from N view points and including N (N represents a natural number) number of sub-pixels, wherein said display panel is a monochrome display panel and when assuming a pitch of said sub-pixels arranged in one direction is a and a pitch of said sub-pixels arranged in a direction orthogonal to said one direction is b, an expression a:b=N:1 results.

A color display panel according to the seventh aspect of the present invention comprises a plurality of display pixels arranged in a matrix, each display pixel being to be viewed from N view points and including 3×N (N represents a natural number) number of three primary color sub-pixels. Said display panel is further constructed such that when assuming a pitch of said sub-pixels arranged in one direction is a and a pitch of said sub-pixels arranged in a direction orthogonal to said one direction is b, an expression a:b=3×N:1 results.

A color display panel according to the eighth aspect of the present invention comprises a plurality of display pixels arranged in a matrix, each display pixel being to be viewed from N view points and including 3×N (N represents a natural number) number of three primary color sub-pixels, said display panel being further constructed such that when assuming a pitch of said sub-pixels arranged in one direction is a and a pitch of said sub-pixels arranged in a direction orthogonal to said one direction is b, an expression a:b=N:3 results.

The above-described display panel can be incorporated within an image display device and when the one direction is made parallel to the longitudinal direction of the ridge projection of the lenticular lens of a three-dimensional image/two-dimensional image display device or the longitudinal direction of the slit opening of the parallax barrier, the display panel can be caused to take a shape of square and the visibility of an image to be displayed can be improved.

An image display method according to the ninth aspect of the present invention is characterized in that, at the time of display of three-dimensional image, at least M×2 number of sub-pixels for two view points of left-eye and right eye in M×N (M represents a natural number and N represents a natural number not less than 2) number of sub-pixels for N view points included in each of a plurality of display pixels arranged in a matrix to constitute a display panel, display images with parallax and a lenticular lens distributes light rays emitted from said sub-pixels for two view points individually to said view points; and at the time of display of two-dimensional image, said sub-pixels for two view points of left eye and right eye display images without parallax, said M×N number of sub-pixels included in each of said display pixels being formed within a square area.

An image display method according to the tenth aspect of the present invention is characterized in that, at the time of display of three-dimensional image, at least N×2 number of sub-pixels for two view points of left-eye and right eye in M×N (M represents a natural number and N represents a natural number not less than 2) number of sub-pixels for N view points included in each of a plurality of display pixels arranged in a matrix to constitute a display panel, display images with parallax and a parallax barrier distributes light rays emitted from said sub-pixels for two view points individually to said view points; and at the time of display of two-dimensional image, said sub-pixels for two view points of left eye and right eye display images without parallax, said M×N number of sub-pixels included in each of said display pixels being formed within a square area.

THE PREFERRED EMBODIMENTS OF THE INVENTION

Preferred embodiments of the invention will be explained in detail below with reference to the attached drawings.

First Embodiment

Figure 5:
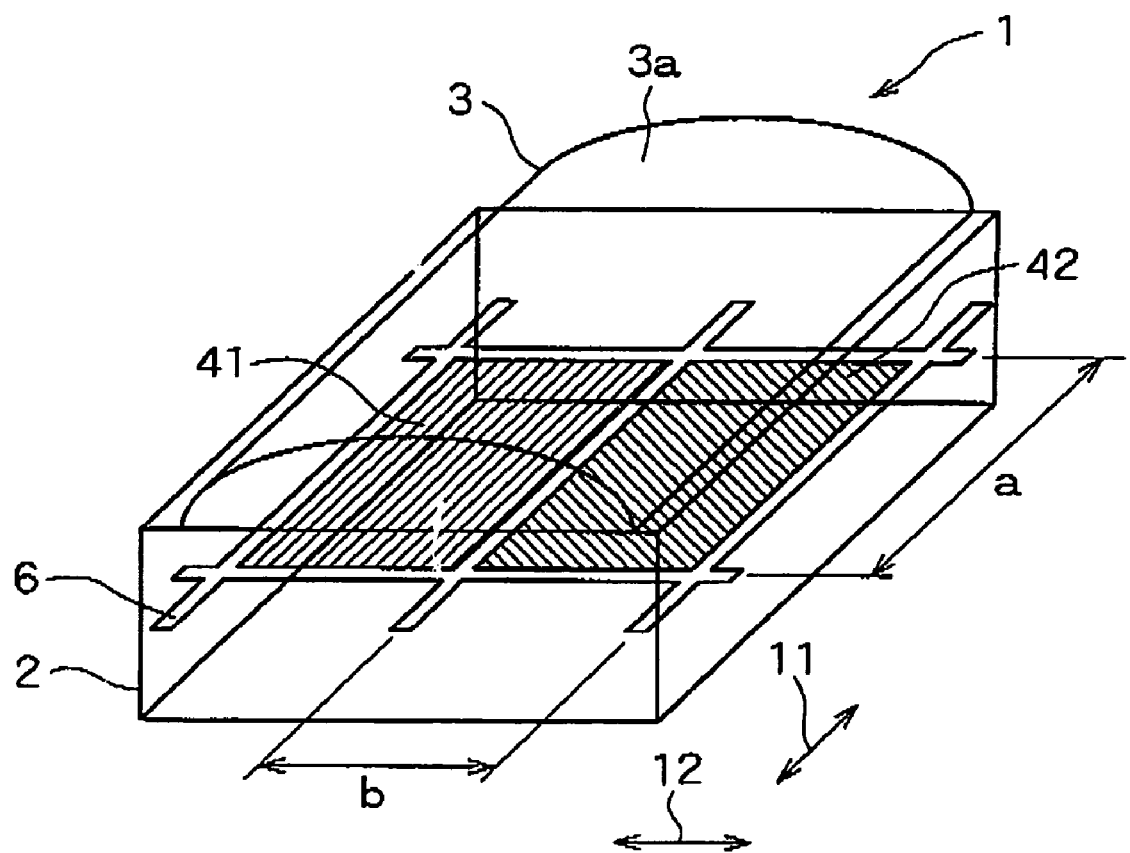
FIG. 5 is a perspective view illustrating an image display device according to a first embodiment of the invention.
Figure 6:
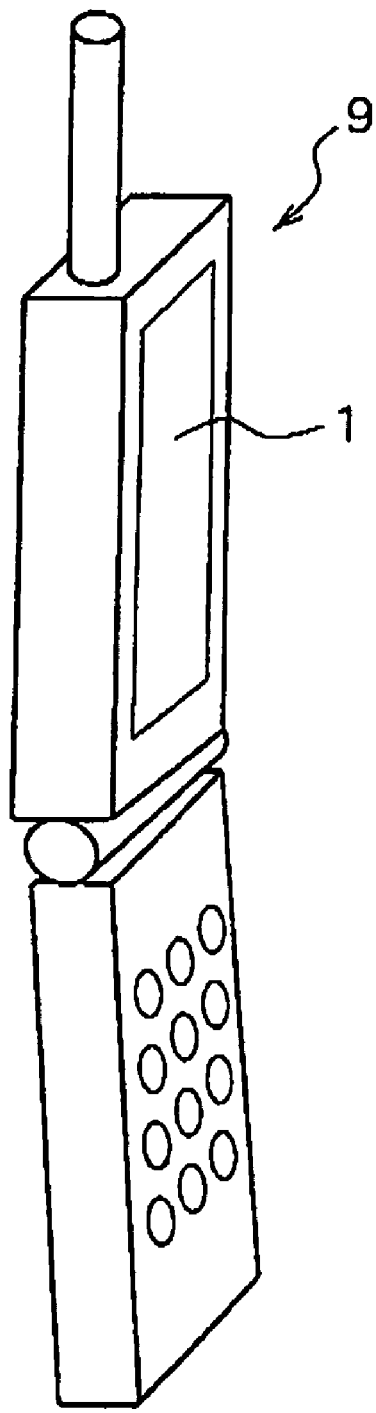
FIG. 6 is a perspective view illustrating a portable terminal device according to the embodiment.
Figure 7:
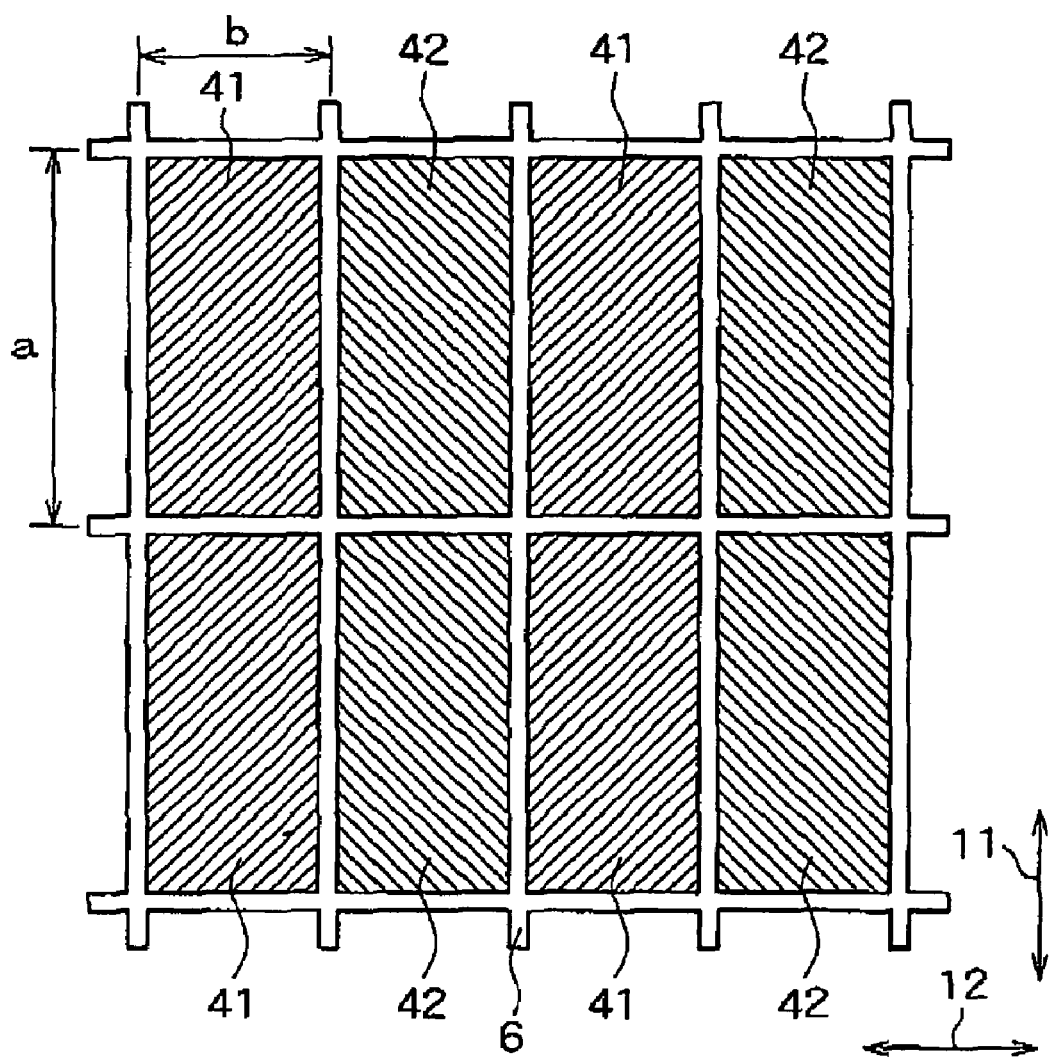
FIG. 7 is a top view illustrating sub-pixels of the image display device according to the embodiment.

FIG. 5 is a perspective view illustrating an image display device according to a first embodiment of the invention and FIG. 6 is a perspective view illustrating a portable terminal device according to the embodiment, and FIG. 7 is a top view illustrating sub-pixels of the image display device according to the embodiment. The image display device according to the embodiment is a three-dimensional image/two-dimensional image display device capable of displaying images so that the images are independently viewed from two viewing points, i.e., a view point for left eye and a view point for right eye, and displaying both the three-dimensional image and the two-dimensional image. As shown in FIG. 5, the three-dimensional image/two-dimensional image display device 1 (hereinafter; also referred to simply as a three-dimensional display device 1) according to the embodiment has provided therein a lenticular lens 3, a display panel 2 and a light source (not shown) in this order when those components are viewed from the location of an observer. The display panel 2 would be, for example, a transmissive liquid crystal display panel. The display panel 2 is comprised of a number of display pixels and in this case, one display pixel consists of two sub-pixels 41 and 42.

Furthermore, the lenticular lens 3 has a plurality of cylindrical lenses 3a arranged in parallel to one another. In the embodiment, the longitudinal direction of the cylindrical lens 3a is assumed to be a vertical direction 11 and the direction along which the cylindrical lenses 3a are arranged is assumed to be a horizontal direction 12. One cylindrical lens 3a out of the plurality of cylindrical lenses that make up the lenticular lens 3 is disposed so as to correspond to the individual sub-pixels 41, 42 of the display panel 2 and the individual sub-pixels 41, 42 serve respectively as a sub-pixel 41 for left eye and a sub-pixel 42 for right eye, based on their positional relationship with respect to the cylindrical lens 3a. Provided between the individual sub-pixels is a light shield section 6. The light shield section 6 is disposed for the purpose of preventing mixture of colors of images and sending a display signal to a pixel.

How a pitch of the sub-pixels arranged is designed in the case where the sub-pixel 41 for left eye and the sub-pixel 42 for right eye are not discriminated from each other is shown in FIG. 7. That is, a ratio of a pitch a of the sub-pixels arranged in the longitudinal direction (vertical direction 11) of the lenticular lens 3 to a pitch b of the sub-pixels arranged in the direction (horizontal direction 12) orthogonal to the longitudinal direction of the lenticular lens 3 is 2:1.

Furthermore, as shown in FIG. 6, the three-dimensional display device 1 according to the embodiment may be incorporated within, for example, a portable phone 9.

Figure 8:
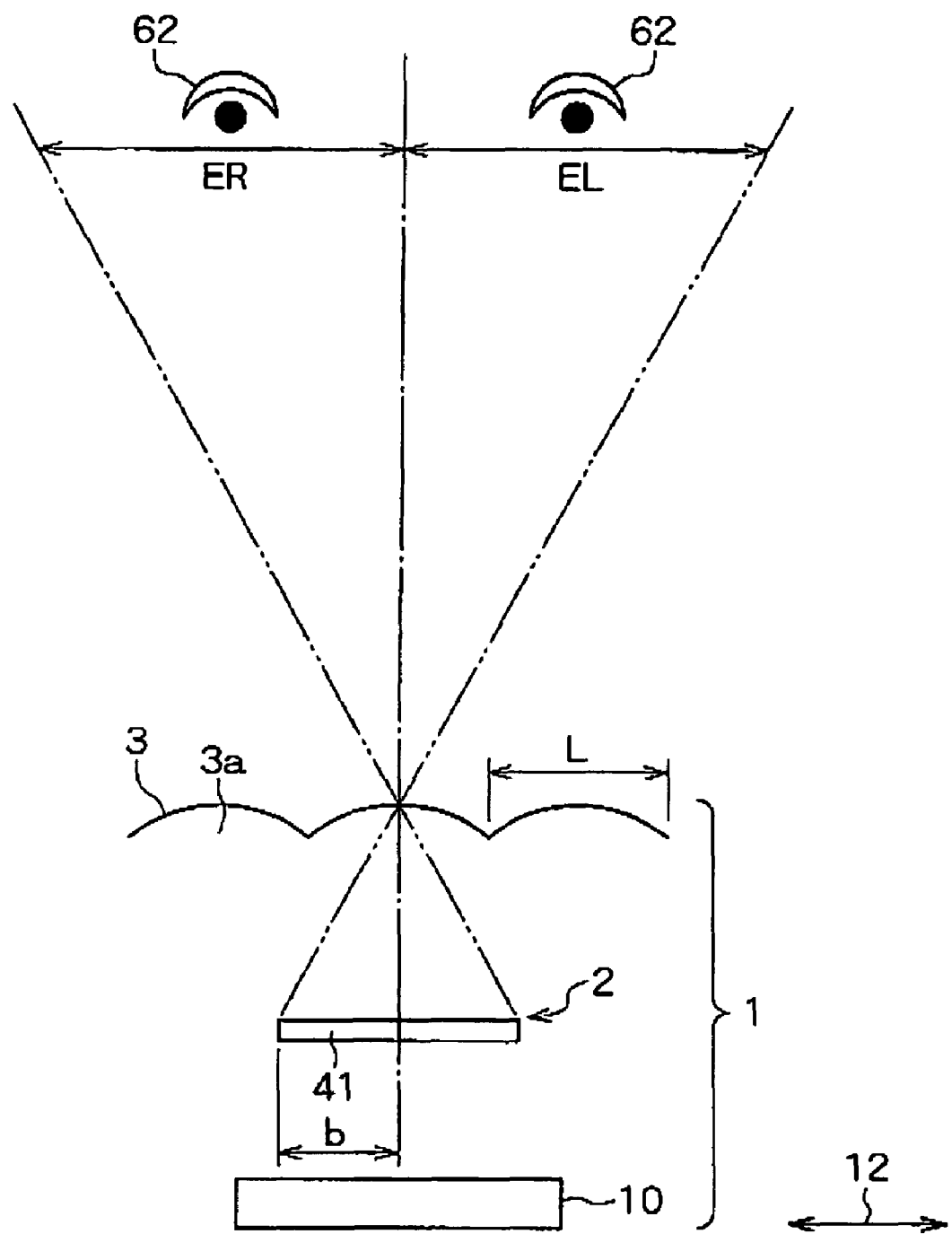
FIG. 8 shows an optical model illustrating how the image display device according to the embodiment operates.

Subsequently, how the three-dimensional display device 1 constructed as described above and in accordance with the embodiment operates, i.e., a method, constructed in accordance with the embodiments for displaying a three-dimensional image and a two-dimensional image will be explained below. FIG. 8 shows an optical model illustrating how the three-dimensional display device according to the embodiment operates. As shown in FIG. 8, when a light source 10 is turned on, light exiting the light source 10 enters the display panel 2. At this point, a control device (not shown) drives the display panel 2, allowing an image for left eye and an image for right eye to be displayed respectively by an aggregate of sub-pixels 41 for left eye and an aggregate of sub-pixels 42 for right eye. Then, lights incident on the sub-pixel 41 for left eye and the sub-pixel 42 for right eye in the display panel 2 transmit through those sub-pixels and propagate to the lenticular lens 3. Thereafter, those lights are refracted by the lenticular lens 3 and exit the lenticular lens, and then, propagate to areas EL and ER, respectively. In this case, when an observer moves his/her eyes so that a left eye 61 is positioned in the area EL and a right eye 62 is positioned in the area ER, an image for left eye (hereinafter, referred to also as a left eye image) is input to the left eye 61 and at the same time, an image for right eye (hereinafter, referred to also as a right eye image) is input to the right eye 62. When a parallax exists between the image for left eye and the image for right eye, the observer is able to identify those images as a three-dimensional image. When no parallax exists between those images, the observer is able to identify the images as a two-dimensional image.

In this case, light from the sub-pixel 41 for left eye passes through one cylindrical lens 3a corresponding to the sub-pixel 41 for left eye and exits the lens 3a, and then, propagates to the area EL. Accordingly, the left eye 61 positioned in the area EL does not identify the pitch b of the sub-pixels 41 for left eye, but identifies a pitch L of the cylindrical lenses 3a as a width of an image to be displayed, which width corresponds to one pixel and is parallel to the horizontal direction 12. Since the cylindrical lenses are disposed so as to correspond to the sub-pixel 41 for left eye and the sub-pixel 42 for right eye as described above, the array pitch L of the cylindrical lenses is approximately twice the array pitch b of the sub-pixels. That is, the width of an image to be displayed on one display pixel, which width is parallel to the horizontal direction 12, is identified as (2×b). Although the above-described explanation has been made of a sub-pixel for left eye and a left eye, the explanation can similarly be applied to a sub-pixel for right eye and a right eye because of left-right symmetric feature of the optical model shown in FIG. 8.

On the other hand, since the vertical direction 11 of an image to be displayed corresponds to the longitudinal direction of the cylindrical lens 3a, the effects of cylindrical lens cannot be produced. Accordingly, as is the case with a general two-dimensional display device, a width of an image to be displayed, which width corresponds to one display pixel and is parallel to the vertical direction 11, equals the array pitch a of the sub-pixels for left eye or the sub-pixels for right eye in the vertical direction 11.

To make vertical and horizontal resolutions of an image to be displayed equal to each other, one display pixel making up an image to be displayed needs to be configured to make the width in the vertical direction 11 and the width in the horizontal direction 12 equal to each other. As described above, the width of display pixel in the vertical direction is a and the width thereof in the horizontal direction is (2×b), and therefore, when those widths are made equal to each other, the vertical and horizontal resolutions of an image to be displayed become equal to each other. That is, the following expression 9 results. The following expression 10 results from the following expression 9. Those expressions exclusively mean that a ratio of the pitch of the sub-pixels arranged in the longitudinal direction (vertical direction 11) of the lenticular lens to the pitch of the sub-pixels arranged in the direction (horizontal direction 12) orthogonal to the longitudinal direction of the lenticular lens is 2:1.

$$a=2\times b \quad \text{(Expression 9)}$$

$$a:b=2:1 \quad \text{(Expression 10)}$$

As described above, in the embodiment, one display pixel has provided therein two sub-pixels, i.e., the sub-pixel 41 for left eye and the sub-pixel 42 for right eye, and therefore, the display device of the embodiment is able to display a three-dimensional image. Furthermore, since a ratio of the width a of each of the sub-pixels in the vertical direction 11 to the width b of each of the sub-pixels in the horizontal direction 12 is 2:1, the display pixel is caused to take a shape of square. Accordingly, the shape of display pixel becomes a square at the time of display of three-dimensional image. This allows an image to be displayed to have high visibility.

Moreover, beneficial effects produced by employment of the embodiment are enlarged especially when character information is displayed as a three-dimensional image. The reason for this is that when reduction in the vertical or horizontal resolution of an image to be displayed occurs, lack of a vertical or horizontal line making up the character information occurs and an observer faces extreme difficulty in identifying the character information. Accordingly, when the vertical and horizontal resolutions of an image to be displayed are made equal, the character information can particularly preferably be displayed in a three-dimensional form.

Furthermore, to allow the three-dimensional display device 1 according to the embodiment to display a two-dimensional image, the display device may be configured so that the same information is displayed by the sub-pixels for left eye and the sub-pixels for right eye. This allows information to be identified by left and right eyes to become the same and therefore parallax information, which exists in case of display of three-dimensional image, does not exist, permitting an image, which is to be displayed, to be identified as a two-dimensional image. In this case, the resolution of an image to be displayed is the same as that achieved at the time of display of three-dimensional image and the display pixel is caused to take a shape of square. As described above, in the embodiment, the resolutions achieved at the time of display of three-dimensional image and at the time of display of two-dimensional image can be made equal to each other, and therefore, even when the three-dimensional image and the two-dimensional image are displayed in a blended fashion, an observer never feels uncomfortable, allowing a three-dimensional image to be displayed at any location where a two-dimensional image is to be displayed. That is, an image is displayed on the screen of the three-dimensional display device so that when a three-dimensional image is displayed by the pixels, an image for left eye and an image for right eye, both images having parallax information, are displayed by the sub-pixels for left eye and the sub-pixels for right eye, respectively and when a two-dimensional image is displayed by the pixels, an image for left eye and an image for right eye, both images having the same information, i.e., no parallax information, are displayed by the sub-pixels for left eye and the sub-pixels for right eye, respectively, thereby allowing a three-dimensional image and two-dimensional image to be displayed in a blended fashion at any location where an image is to be displayed.

Still furthermore, since the three-dimensional image/two-dimensional image display device according to the embodiment employs a lenticular lens as means for displaying a three-dimensional image, it has an advantage over the display device using a parallax barrier in that a black fringe due to a parallax barrier is not produced and loss of light is small.

The three-dimensional image/two-dimensional image display device according to the embodiment can preferably be applied to a portable device such as a cellular phone and is capable of displaying a preferable three-dimensional image and two-dimensional image. When the three-dimensional image/two-dimensional image display device according to the embodiment is applied to a portable device, an observer is able to optionally adjust positional relationship between his/her both eyes and a display screen, which operation is impossible to perform when the three-dimensional image/two-dimensional image display device according to the embodiment is applied to a large scale display device, and therefore, the observer is able to find a optimal visible range without delay. Moreover, the three-dimensional image/two-dimensional image display device according to the embodiment can be applied not only to a cellular phone but to a portable terminal device such as a portable terminal, PDA, game machine, digital camera, and digital video camera.

It should be appreciated that the focal distance of a lenticular lens is preferably set to be different from a distance between the lenticular lens and the display pixel. This allows reduction in variations in brightness of an image to be displayed, which variations are caused by the light shield section partitioning the display pixels when an observer changes his/her observing position, and further allows brightness of an image to be displayed to become uniform regardless of observer's observing positions.

Figure 9:
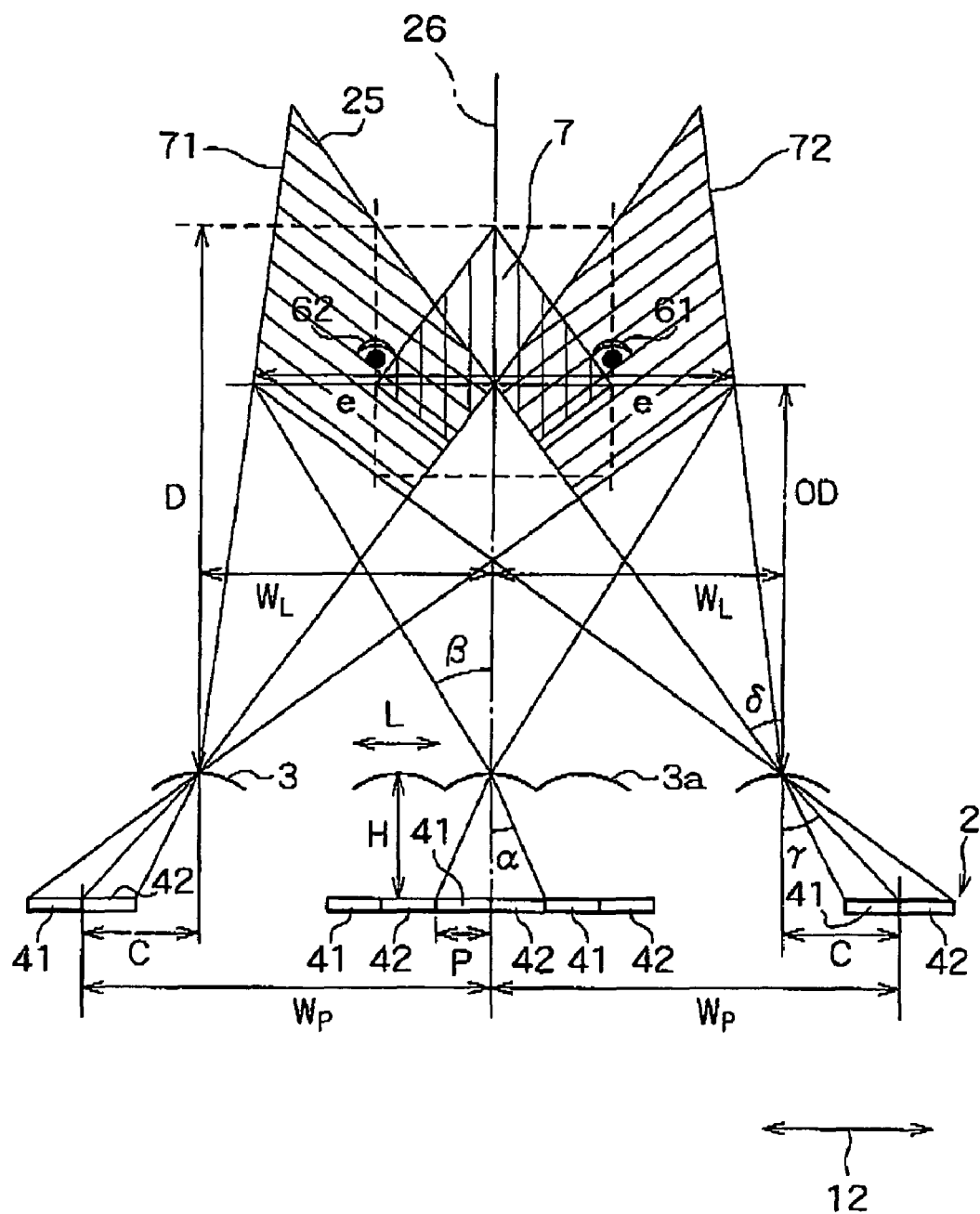
FIG. 9 shows an optical model illustrating a dual eye type three-dimensional image display device using a typical lenticular lens.

To explain the above-described beneficial effects, how the size of each part of a dual eye type three-dimensional image display device incorporating therein a typical display panel and lenticular lens is determined will be first explained. FIG. 9 shows an optical model illustrating a dual eye type three-dimensional image display device using a typical lenticular lens. As shown in FIG. 9, the dual eye type three-dimensional image display device is constructed such that a focal distance of a lenticular lens 3 is equal to a distance between an apex of the lenticular lens 3 and pixels of a display panel 2. The configuration of the three-dimensional display device other than the above-described configuration is similar to that of the three-dimensional display device 1 shown in FIG. 8 and constructed in accordance with the embodiment.

In the device shown in FIG. 9, it is assumed that the distance between the apex of the lenticular lens 3 and the pixels of the display panel 2 is H, a refractive index and focal distance of the lenticular lens 3 is n and f, respectively, and a pitch of lenses making up the lenticular lens 3 is L. Display pixels of the display panel 2 are constructed such that a plurality of sets of one sub-pixel 41 for left eye and one sub-pixel 42 for right eye are arranged. Assume that a pitch of those sub-pixels is P. Accordingly, an array pitch of the display pixels, each consisting of one sub-pixel 41 for left eye and one sub-pixel 42 for right eye, is 2P. One cylindrical lens 3a is disposed so as to correspond to the display pixel consisting of the two sub-pixels, i.e., one sub-pixel 41 for left eye and one sub-pixel 42 for right eye.

Additionally, assume that a distance between the lenticular lens 3 and an observer is an optimal observation distance OD, and a width over which one sub-pixel is projected in a magnified form on a plane apart from the lenticular lens 3 the distance OD, i.e., a width over which each of the sub-pixel 41 for left eye and the sub-pixel 42 for right eye is projected in a magnified form on a virtual plane that is apart from the lens the distance OD and parallel to the lens is e. Furthermore, assume that a distance, in a horizontal direction 12, between the center of the cylindrical lens 3a located in the central portion of the lenticular lens 3 and the center of the cylindrical lens 3a located in the end portion of the lenticular lens 3 is $W_L$, and a distance, in the horizontal direction 12, between the center of the display pixel consisting of the sub-pixel 41 for left eye and the sub-pixel 42 for right eye, both sub-pixels being located in the central portion of the display panel 2, and the center of the display pixel that is located in the end portion of the display panel 2 is $W_P$. Still furthermore, assume that an incident angle of light to the cylindrical lens 3a that is located in the central portion of the lenticular lens 3 and an exit angle of light from the cylindrical lens 3a is α and β, respectively, and an incident angle of light to the projection (cylindrical lens) 3a that is located in the end portion of the lenticular lens 3 in the horizontal direction 12 and an exit angle of light from the same projection 3a is γ and δ. Still furthermore, assume that a difference between the distance $W_L$ and the distance $W_P$ is C, and the number of the sub-pixels included in an area covering the distance $W_P$ is 2m.

Since the array pitch L of the cylindrical lenses 3a and the array pitch P of the sub-pixels are related to each other, determination of one of the two pitches allows determination of the other of the two pitches. However, in many cases, a lenticular lens is designed so as to fit a display panel and therefore the array pitch P of the sub-pixels is handled as a constant. Moreover, selecting a material for the lenticular lens 3 allows determination of a refraction index n. In consideration of the refraction index determined as described above, the observation distance OD between the lens and the observers and the width e over which one sub-pixel is projected in a magnified form on a plane apart from the lens the distance OD are determined to have a desired value. Through the use of those values, a distance H between the apex of the lens and the display pixel and the pitch L of the lenses are determined. Snell's law and a geometric relationship resulting from the above-described assumption allow the following expressions 11 to 16 to result. Moreover, the following expressions 17 to 19 result.

$$n \times \sin\alpha = \sin\beta \quad \text{(Expression 11)}$$

$$OD \times \tan\beta = e \quad \text{(Expression 12)}$$

$$H \times \tan\alpha = P \quad \text{(Expression 13)}$$

$$n \times \sin\gamma = \sin\delta \quad \text{(Expression 14)}$$

$$H \times \tan\gamma = C \quad \text{(Expression 15)}$$

$$OD \times \tan\delta = W_L \quad \text{(Expression 16)}$$

$$W_P - W_L = C \quad \text{(Expression 17)}$$

$$W_P = 2 \times m \times P \quad \text{(Expression 18)}$$

$$W_L = m \times L \quad \text{(Expression 19)}$$

The above-described expressions 11 to 13 allow the following expressions 20 to 22 to result respectively.

$$\beta = \arctan(e/OD) \quad \text{(Expression 20)}$$

$$\alpha = \arcsin((1/n) \times \sin\beta) \quad \text{(Expression 21)}$$

$$H = P/\tan\alpha \quad \text{(Expression 22)}$$

Additionally, the above-described expressions 16 to 19 allow the following expression 23 to result. Moreover, the above-described expressions 18 and 19 allow the following expression 24 to result. Furthermore, the above-described expression 15 allows the following expression 25 to result.

$$\delta = \arctan(mL/OD) \quad \text{(Expression 23)}$$

$$C = 2 \times m \times P - m \times L \quad \text{(Expression 24)}$$

$$\gamma = \arctan(C/H) \quad \text{(Expression 25)}$$

It should be noted that as described above, the distance B between the apex of the lenticular lens and the display pixel is usually made equal to the focal distance f of the lenticular lens, and therefore, the following expression 26 results, and further, when assuming a curvature radius of the lens is r, the curvature radius r is determined by the following expression 27.

$$f = H \quad \text{(Expression 26)}$$

$$r = H \times (n-1)/n \quad \text{(Expression 27)}$$

As shown in FIG. 9, it is assumed that an area that lights from all of the sub-pixels 42 for right eye reach is a right eye area 71 and an area that lights from all of the sub-pixels 41 for left eye reach is a left eye area 72. When an observer moves his/her eyes so that a right eye 62 is positioned in the right eye area 71 and a left eye 61 is positioned in the left eye area 72, he/she is able to identify a three-dimensional image. Note that since binocular interval of the observer is constant, the observer is not necessarily able to move his/her eyes so that the right eye 62 and the left eye 61 are positioned at any location within the right eye area 71 and the left eye area 72, respectively, and the both eyes are positioned in a specific area which allows the binocular interval to be constant. That is, only when the midpoint between the right eye 62 and the left eye 61 is positioned within a three-dimensional visible range 7, the binocular vision is realized. The position at which a distance from the display panel 6 becomes the optimal observation distance OD allows a length along the horizontal direction 12 within the three-dimensional visible range 7 to become maximum and thereby permits the latitude to which displacement of the position of observer in the horizontal direction 12 is allowed to become maximum. This means that the position at which the distance from the display panel 6 becomes the optimal observation distance OD is a most ideal viewing position.

Furthermore, assume that a distance between a point that is located within the three-dimensional visible range 7 and farthest from the display panel 6 and the display panel 6 is a maximum observation distance D. To calculate the maximum observation distance D, as shown in FIG. 9, a distance between a point that is defined such that a light ray 25 emitted from the left end of the sub-pixel 42 for right eye located in the right end portion of the display panel 2 is determined in the figure and then a point apart from an optical system center line 26 the distance equal to (e/2) in the left direction in the figure is determined on the light ray 25, and the display panel 2 may be determined. A geometric relationship shown in FIG. 9 allows the following expression 28 to result, which in turn allows the maximum observation distance D to be determined by the following expression 29.

$$W_L:OD=(W_L+e/2):D \quad \text{(Expression 28)}$$

$$D=OD \times (W_L+e/2)/W_L \quad \text{(Expression 29)}$$

Figure 10:
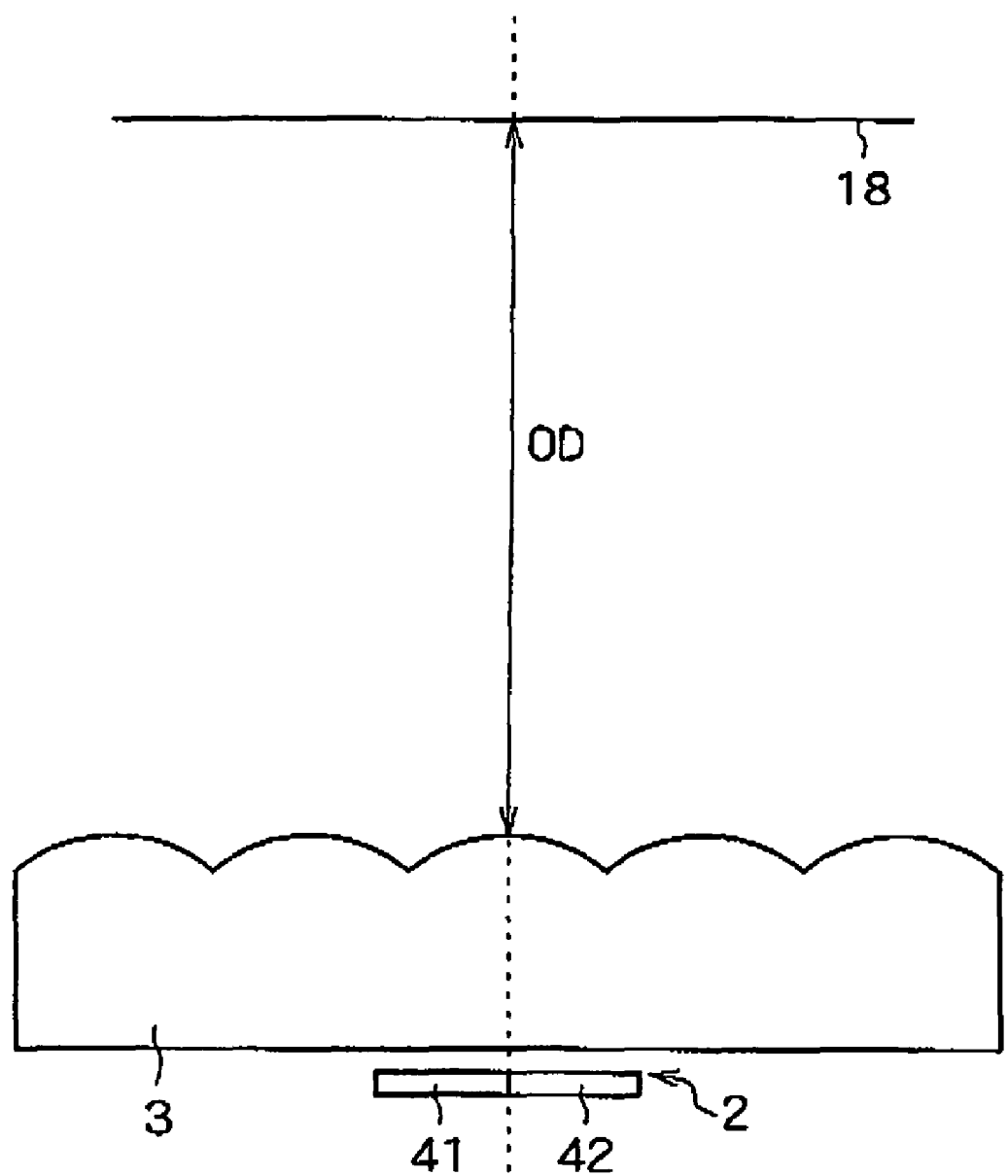
FIG. 10 shows an optical model illustrating how the simulation is performed in the embodiment.

Based on the above-described geometric design, the three-dimensional image display device was simulated by a computer through the use of commercially available light ray tracing simulator. FIG. 10 shows an optical model illustrating how the simulation is performed in the embodiment. As shown in FIGS. 5 and 6, in the present simulation, it is assumed that the display panel 2 has provided therein the sub-pixels with a pitch P of 0.24 mm. Furthermore, to facilitate simulation, the display panel 2 was assumed to have only one set of sub-pixel 41 for left eye and sub-pixel 42 for right eye positioned in the central portion of the display panel 2. Each of those sub-pixels is constructed such that a light-emitting area (not shown) is provided in the center of the sub-pixel and non light-emitting areas (not shown) are provided on both sides of the light emitting area. The non light-emitting areas correspond to a light shield section that is disposed for the purpose of preventing mixture of colors of images and sending a display signal to a pixel. The width of one sub-pixel is 0.24 mm, which is equal to the array pitch P of sub-pixels, and the width of the light-emitting area is assumed to be 0.186 mm. Accordingly, the width of one of the non light-emitting areas is 0.027 mm, which is determined by the expression (0.240-0.186)/2=0.027 mm.

Additionally, assume that the material making up the lenticular lens 3 is polymethylmethacrylate (PMMA) having a refraction index n of 1.49 and the observation distance OD between the lens and the observer is 280 mm. That is, a light reception surface 18 is disposed apart from the surface of the lenticular lens 3 a distance of 280 mm. Then, assume that the width e (refer to FIG. 9) over which one sub-pixel is projected in a magnified form on the light reception surface 18 is 65 mm and the aforementioned m has a value of 60. This leads to the conclusion that based on the above-described individual expressions, the distance H between a lens surface and the display pixel is 1.57 mm, the focal distance f of the lens is 1.57 mm, the pitch L of the lenses is 0.4782 mm, and the curvature radius r of the lens is 0.5161 mm.

Figure 11:
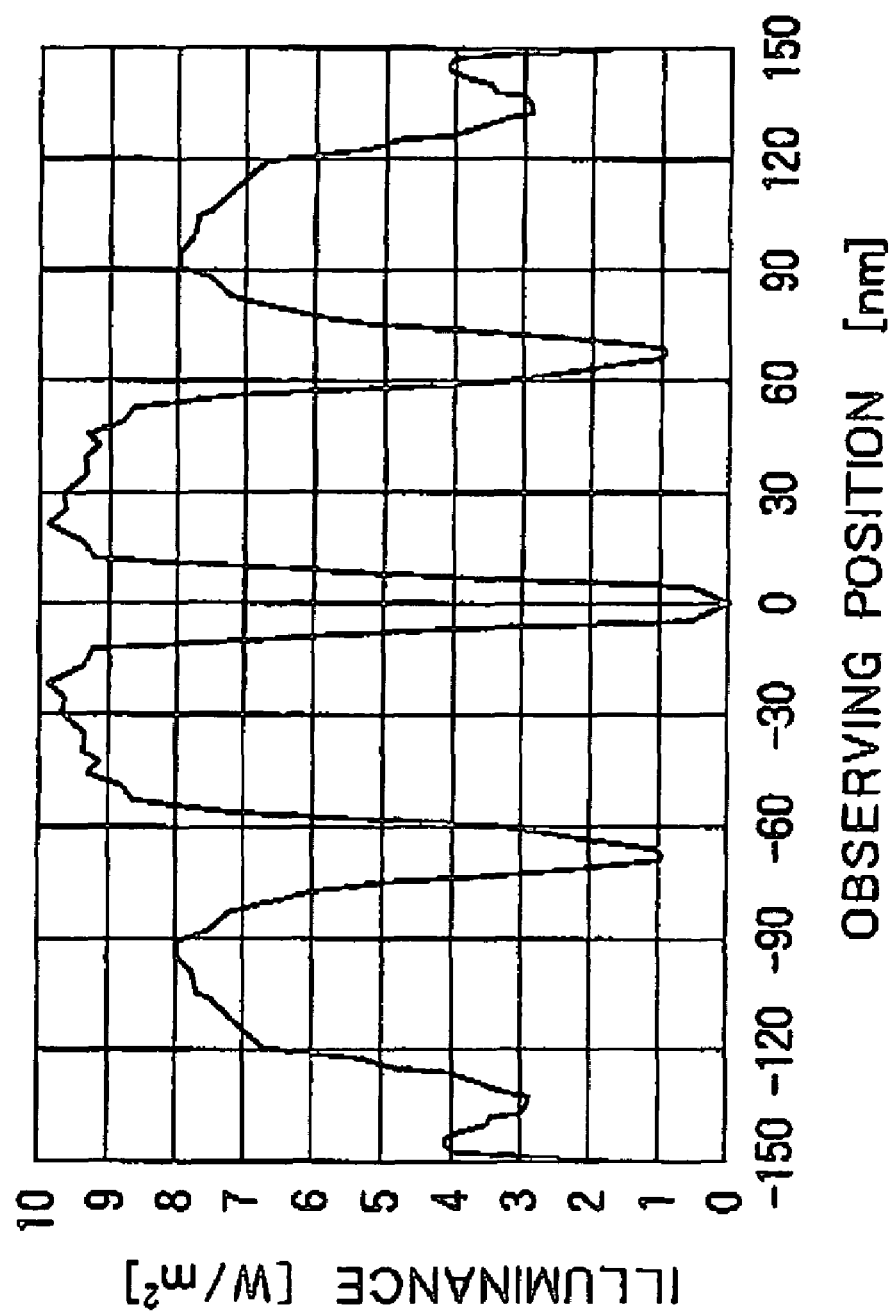
FIG. 11 is a graph resulting from the simulation, in which axis of abscissas denotes the coordinate of a observing position on the light reception surface and axis of ordinate denotes illuminance at the observing position.

FIG. 11 is a graph resulting from the simulation, in which axis of abscissas denotes the coordinate of a observing position on the light reception surface and axis of ordinate denotes an illuminance at the observing position. Note that the coordinate of viewing position is determined by reference to the optical system center line 26 shown in FIG. 9. As shown in FIG. 11, when the coordinate of observing position is in the range of −60 mm to 0 mm, the illuminance becomes high and the value of the illuminance is uniform as a whole. That is, when the right eye is positioned in the range of −60 mm to 0 mm, a sufficient amount of light enters the right eye. Furthermore, when the coordinate of observing position is in the range of 0 mm to +60 mm, the illuminance becomes high and the value of the illuminance is uniform as a whole. That is, when the left eye is positioned in the range of 0 mm to +60 mm, a sufficient amount of light enters the left eye. This means that when the three-dimensional image display device is actually operated so that a left eye image is displayed by the sub-pixels for left eye and a right eye image is displayed by the sub-pixels for right eye, the left eye image is input to the left eye and the right eye image is input to the right eye, and in this case, separation of both images is sufficiently secured, thereby allowing an observer to clearly identify the three-dimensional image.

On the other hand, the illuminance around the observing positions corresponding to the coordinates 0 mm and +60 mm is being reduced. For this reason, the observer at those observing positions cannot identify the image. This is due to the influence of the light shield section. In the embodiment, especially at the time of display of three-dimensional image, the observer searches for observing positions to find a observing position suited to view a three-dimensional image and potentially moves his/her view point to the three-dimensional visible range. However, at the time of display of two-dimensional image, the observer views the same image through his/her left and right eyes and therefore the observer cannot determine the location of the three-dimensional visible range. Accordingly, the probability with which the observer moves his/her eyes to observing positions, at which the illuminance is reduced, to view a two-dimensional image becomes higher at the time of display of two-dimensional image than at the time of display of three-dimensional image, causing the observer to feel that the resulting quality of a two-dimensional image to be displayed is reduced.

In consideration of the above-described problems, the three-dimensional image/two-dimensional image display device according to the embodiment is configured so that the focal distance of the lenticular lens is made different from the distance between the apex of the lenticular lens and the display pixel. That is, instead of the aforementioned expression 26, the following expression 30 or expression 31 is used.

$$f>H \quad \text{(Expression 30)}$$

$$f<H \quad \text{(Expression 31)}$$

Figure 12:
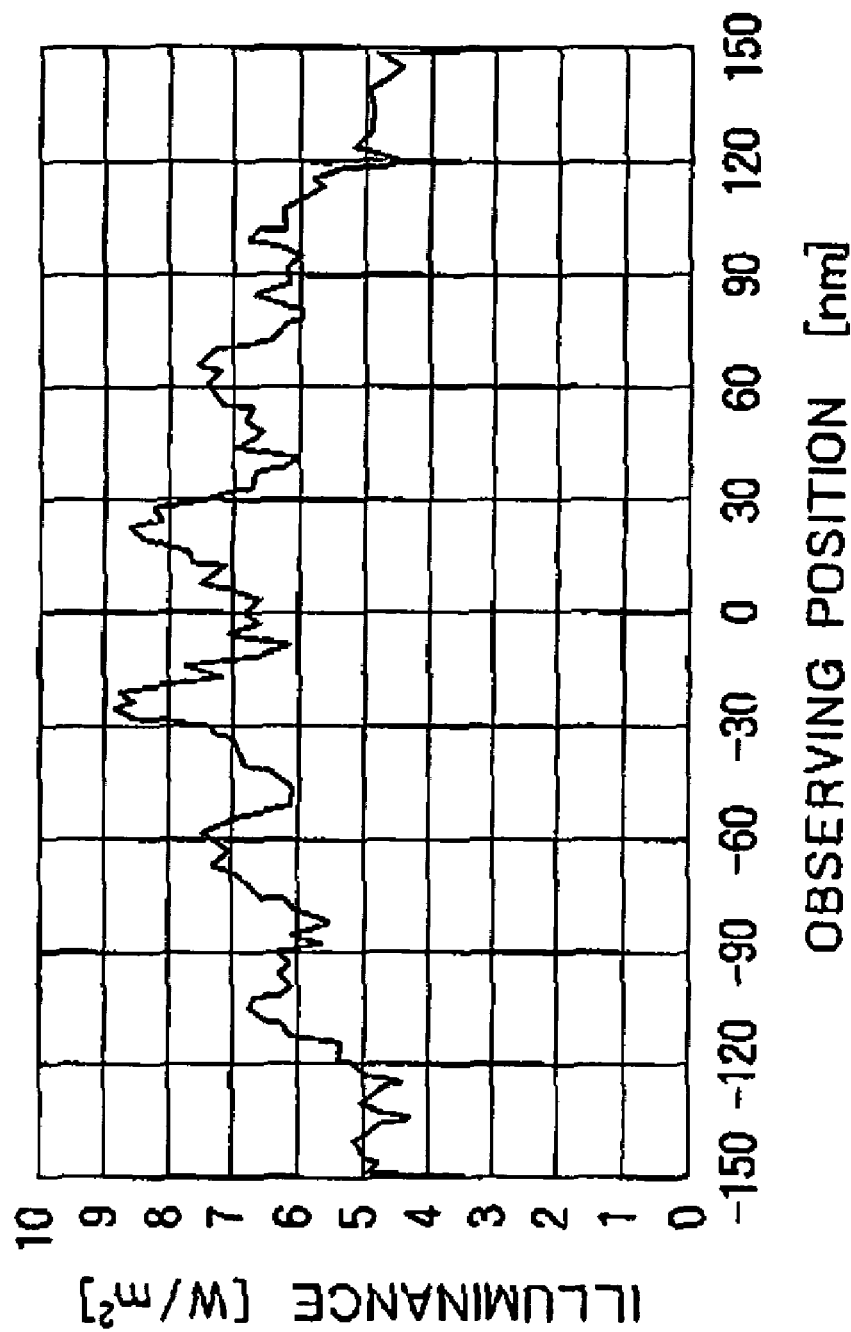
FIG. 12 is a graph resulting from the simulation, in which axis of abscissas denotes the coordinate of a observing position on the light reception surface, axis of ordinate denotes an illuminance at the observing position, and the focal distance of lenticular lens is assumed to be 1.88 mm.

Accordingly, light exiting the lenticular lens reaches the observer in a spread fashion. As a result, the influence of the light shield section can be reduced. FIG. 12 is a graph resulting from the simulation, in which axis of abscissas denotes the coordinate of an observing position on the light reception surface, axis of ordinate denotes an illuminance at the observing position, and the focal distance of lenticular lens is assumed to be 1.88 mm. As shown in FIG. 12, it would be appreciated that making the focal distance f of the lenticular lens different from the distance H between the apex of the lenticular lens and the display pixel reduces the degree to which the illuminance at the observing positions corresponding to the coordinates 0 mm and ±60 mm is reduced. This allows the observer not to view a two-dimensional image from an area in which the illuminance is reduced, thereby increasing the quality of a two-dimensional image to be displayed.

The above-described beneficial effects can be obtained also when a three-dimensional image is displayed. However, at the time of display of three-dimensional image, the left eye image and the right eye image are different from each other and therefore the probability of occurrence of a cross talk, which is defined in this case such that the right eye image is viewed by the left eye, is increased. In contrast, at the time of display of two-dimensional image, the left eye image and the right eye image are the same and therefore the cross talk never occurs.

It should be noted that although the focal distance is changed in the above-described explanation, instead, the focal distance may be kept unchanged and the distance between the apex of the lenticular lens and the display pixel may be changed in order to produce beneficial effects similar to the above-mentioned beneficial effects.

Furthermore, although the embodiment employs a transmissive liquid crystal display panel as a display panel, the invention is not limited to the embodiment, but may employ a reflective liquid crystal display panel or a semi-transmissive liquid crystal display panel having a transmissive region and a reflective region provided in each of pixels. Additionally, a method for driving a liquid crystal display panel would be an active matrix method such as a TFT (Thin Film Transistor) method and TFD (Thin Film Diode) method, or a passive matrix method such as an STN (Super Twisted Nematic liquid crystal) method. Moreover, the invention may employs as a display panel, other than the liquid crystal display panel, for example, an organic electroluminescence display panel, plasma display panel, CRT (Cathode-Ray Tube) display panel, LED (Light Emitting Diode) display panel, field emission display panel, or PALC (Plasma Address Liquid Crystal) panel.

Furthermore, although the embodiment has been explained as an example applied to the case where an image is viewed from two view points and accordingly, one display pixel consists of two sub-pixels, the invention can similarly be applied to the case where an image is viewed from N (N is an integer greater than 2) number of view points.

Still furthermore, although the embodiment employs a lenticular lens, the embodiment may employ a fly-eye lens instead of lenticular lens. Still furthermore, the embodiment may be configured to display a color image on a time-sharing method.

Second Embodiment

Figure 13:
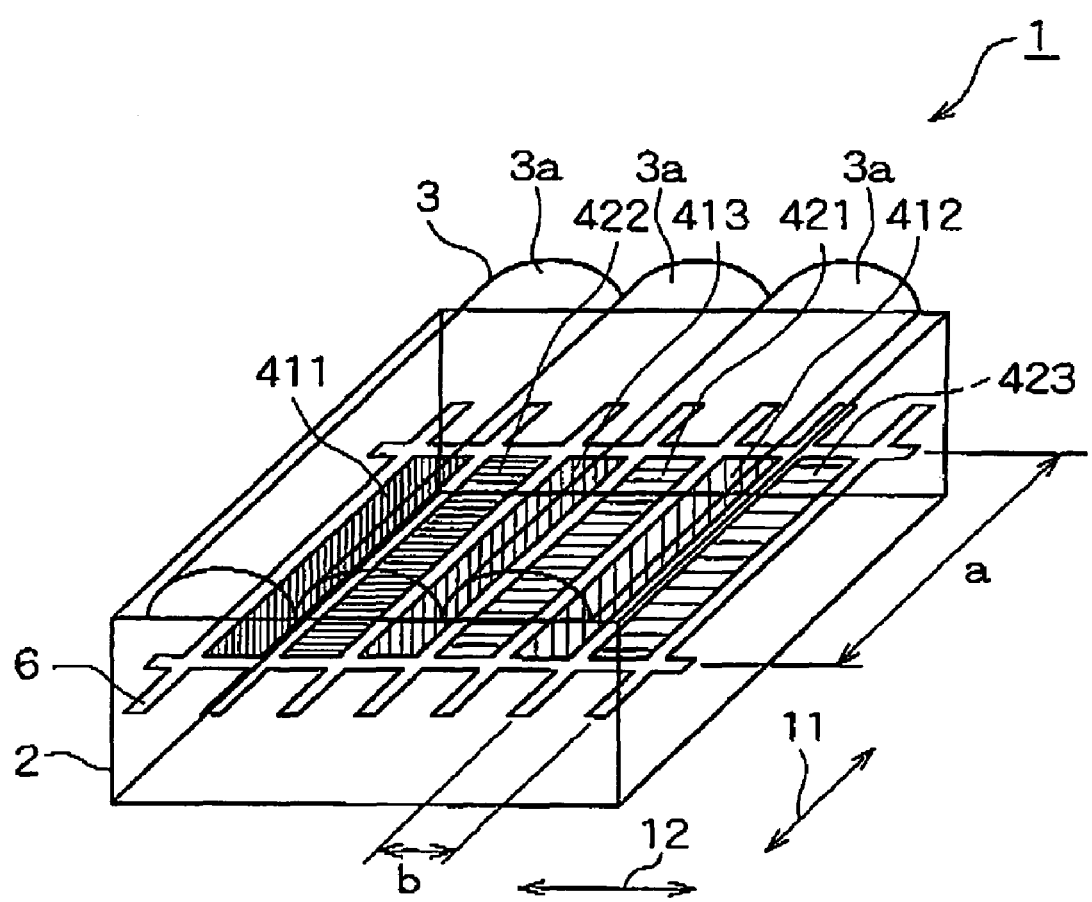
FIG. 13 is a perspective view illustrating an image display device according to a second embodiment of the invention.
Figure 14:
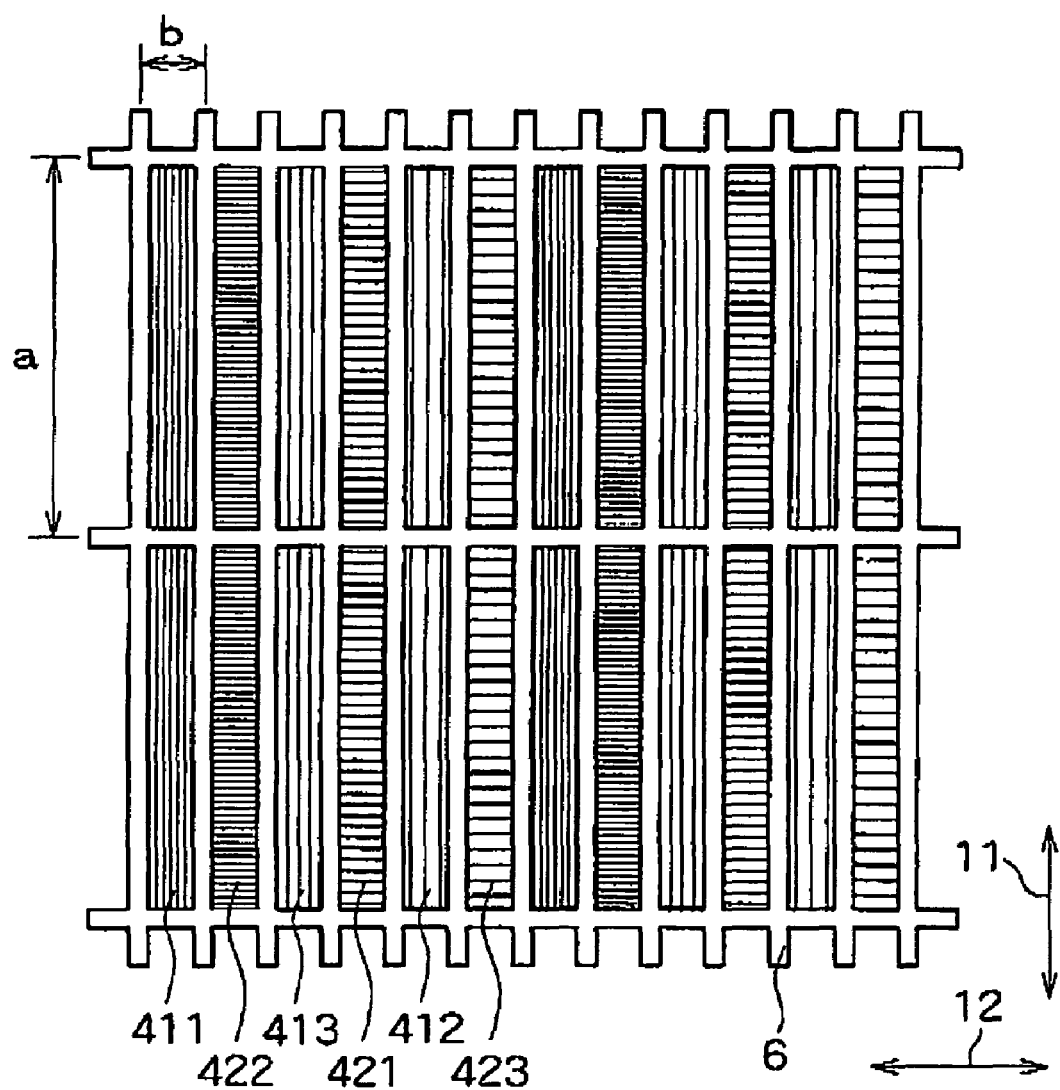
FIG. 14 is a top view illustrating a pitch of sub-pixel arranged in the display device.

Subsequently, a second embodiment of the invention will be explained below. FIG. 13 is a perspective view illustrating an image display device according to the embodiment and FIG. 14 is a top view illustrating a pitch of sub-pixels arranged in a display panel. As shown in FIGS. 9 and 10, the embodiment is different from the aforementioned first embodiment in that a display panel 2 has color display means such as a color filter and as a result, one display pixel is comprised of six primary color sub-pixels that are viewed from two view points. Moreover, three cylindrical lenses 3a of a lenticular lens 3 correspond to one display pixel, a set of a red sub-pixel 411 for left eye and a green sub-pixel 422 for right eye corresponds to one cylindrical lens 3a, a set of a blue sub-pixel 413 for left eye and a red sub-pixel 421 for right eye corresponds to another cylindrical lens 3a, and a set of a green sub-pixel 412 for left eye and a blue sub-pixel 423 for right eye corresponds to still another cylindrical lens 3a. That is, one display pixel has the red sub-pixel 411 for left eye, green sub-pixel 422 for right eye, blue sub-pixel 413 for left eye, red sub-pixel 421 for right eye, green sub-pixel 412 for left eye, and blue sub-pixel 423 for right eye arranged one by one in a line in this order along a horizontal direction 12. Furthermore, a pitch a of sub-pixels arranged in the longitudinal direction (vertical direction 11) of the lenticular lens 3 and a pitch b of the sub-pixels arranged in a direction (horizontal direction) orthogonal to the longitudinal direction of the lenticular lens 3 satisfy the following expression 32.

$$a:b=3\times N:1 \qquad \text{(Expression 32)}$$

A three-dimensional display device according to the embodiment is configured so that an image to be displayed is viewed from two view points, i.e., N in the expression 32 is 2, and therefore, a b=6:1 results from the above-described expression 32. Moreover, as shown in FIG. 13, the six sub-pixels are arranged in a line along the short sides of those sub-pixels to form one display pixel and therefore the display pixel is caused to take a shape of square. The configuration and operation of the embodiment other than the above-described configuration is similar to that of the first embodiment.

According to the embodiment, a color image can be displayed. Beneficial effects of the embodiment other than the above-described beneficial effects are similar to those of the aforementioned first embodiment. That is, a color three-dimensional image/two-dimensional image display device can be achieved which is capable of displaying a three-dimensional image without reducing resolution, simultaneously displaying a two-dimensional image and three-dimensional image with the same resolution, and displaying a three-dimensional image and two-dimensional image in a blended fashion at any location where an image is to be displayed.

It should be noted that color arrangement employed in the three-dimensional display device of the embodiment is only an example and the invention is in no way limited to the order observed in the above color arrangement. Furthermore, although the three-dimensional display device allowing view from two view points has been shown in the embodiment, the invention is not limited to such configuration, but may be applied to a display device allowing view from N (N is an integer not less than 3) number of view points.

Third Embodiment

Figure 15:
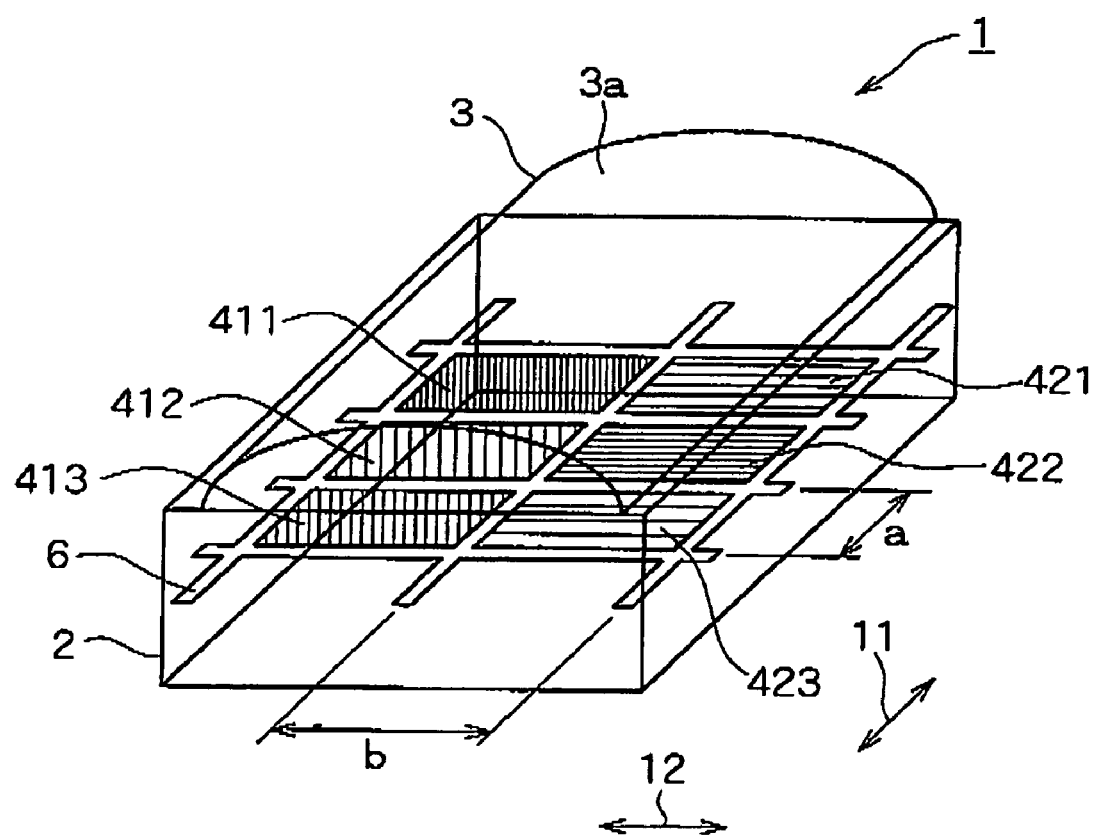
FIG. 15 is a perspective view illustrating an image display device according to a third embodiment of the invention.
Figure 16:
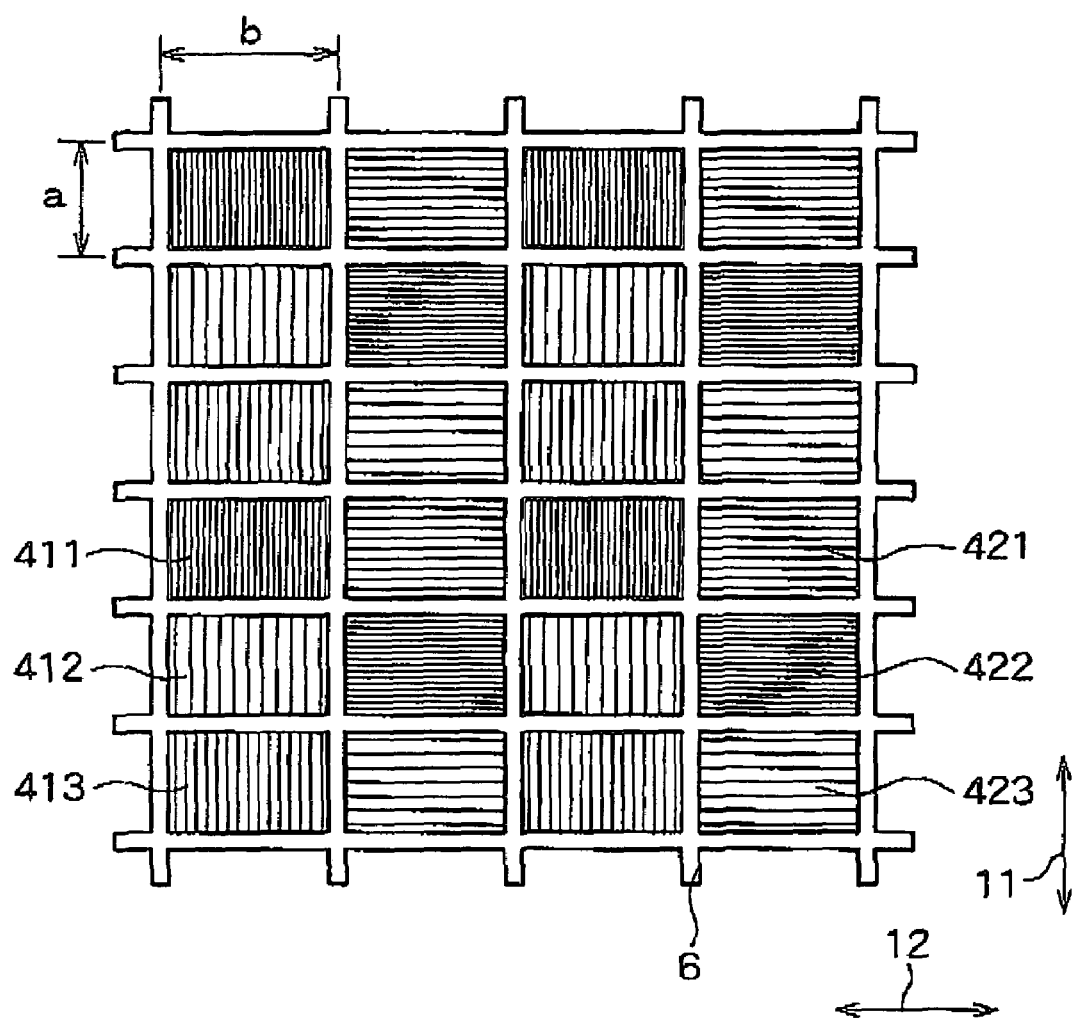
FIG. 16 is a top view illustrating a pitch of sub-pixels arranged in the display device.

Subsequently, a third embodiment of the invention will be explained below. FIG. 15 is a perspective view illustrating an image display device according to the embodiment and FIG. 16 is a top view illustrating a pitch of sub-pixels arranged in the display device. As shown in FIGS. 11 and 12, the embodiment is different from the aforementioned second embodiment in how the sub-pixels are arranged within a display pixel. As a result, the embodiment is constructed such that one cylindrical lens 3a of a lenticular lens 3 corresponds to one display pixel and a direction in which the same-color areas, each being comprised of color display means such as a color filter, are sequentially arranged is orthogonal to the longitudinal direction of the lenticular lens, i.e., is a horizontal direction 12.

That is, a three-dimensional display device 1 of the embodiment has one display pixel provided therein so that a red sub-pixel 411 for left eye, a green sub-pixel 412 for left eye and a blue sub-pixel 413 for left eye are arranged in a line in this order along the vertical direction 11, and further, a red sub-pixel 421 for right eye, a green sub-pixel 422 for right eye and a blue sub-pixel 423 for right eye are arranged in a line in this order along the vertical direction 11. Additionally, the red sub-pixel 411 for left eye and the red sub-pixel 421 for right eye are arranged in a line along the horizontal direction 12, the green sub-pixel 412 for left eye and the green sub-pixel 422 for right eye are arranged in a line along the horizontal direction 12, and the blue sub-pixel 413 for left eye and the blue sub-pixel 423 for right eye are arranged in a line along the lateral direction 12. Furthermore, a pitch a of sub-pixels arranged in the longitudinal direction (vertical direction 11) of the lenticular lens and a pitch b of the sub-pixels arranged in a direction (horizontal direction 12) orthogonal to the longitudinal direction of the lenticular lens satisfy the following expression 33.

$$a:b=N:3 \quad \text{(Expression 33)}$$

The three-dimensional display device according to the embodiment allows view from two view points, i.e., corresponds to the case where N=2 and therefore a:b=2:3 results from the above-described expression 33. Moreover, as shown in FIG. 15, the six sub-pixels are arranged in a matrix of two columns and three rows to form one display pixel and therefore the display pixel is caused to take a shape of square. The configuration and operation of the embodiment other than the above-described configuration and operation are similar to those of the first embodiment.

According to the aforementioned second embodiment, one display pixel has the (3×N) number of sub-pixels arranged in a direction (horizontal direction 12) orthogonal to the longitudinal direction of the lenticular lens. Whereas in the embodiment, three sub-pixels are arranged in the longitudinal direction of the lenticular lens and N number of sub-pixels are arranged in a direction orthogonal to the longitudinal direction, allowing the sub-pixels to be arranged in a distributed fashion in the vertical direction 11 and horizontal direction 12 within the display panel. As a result, the degree of how many sub-pixels are integrated in the horizontal direction 12 within the display panel is reduced, advantageously facilitating manufacture of display device.

It should be noted that color arrangement employed in the embodiment is only an example and the invention is in no way limited to the order observed in the above color arrangement. Furthermore, although the three-dimensional display device allowing view from two view points has been shown in the embodiment, the invention is not limited to such configuration, but may be applied to a display device allowing view from N (N is an integer not less than 3) number of view points.

Fourth Embodiment

Figure 17:
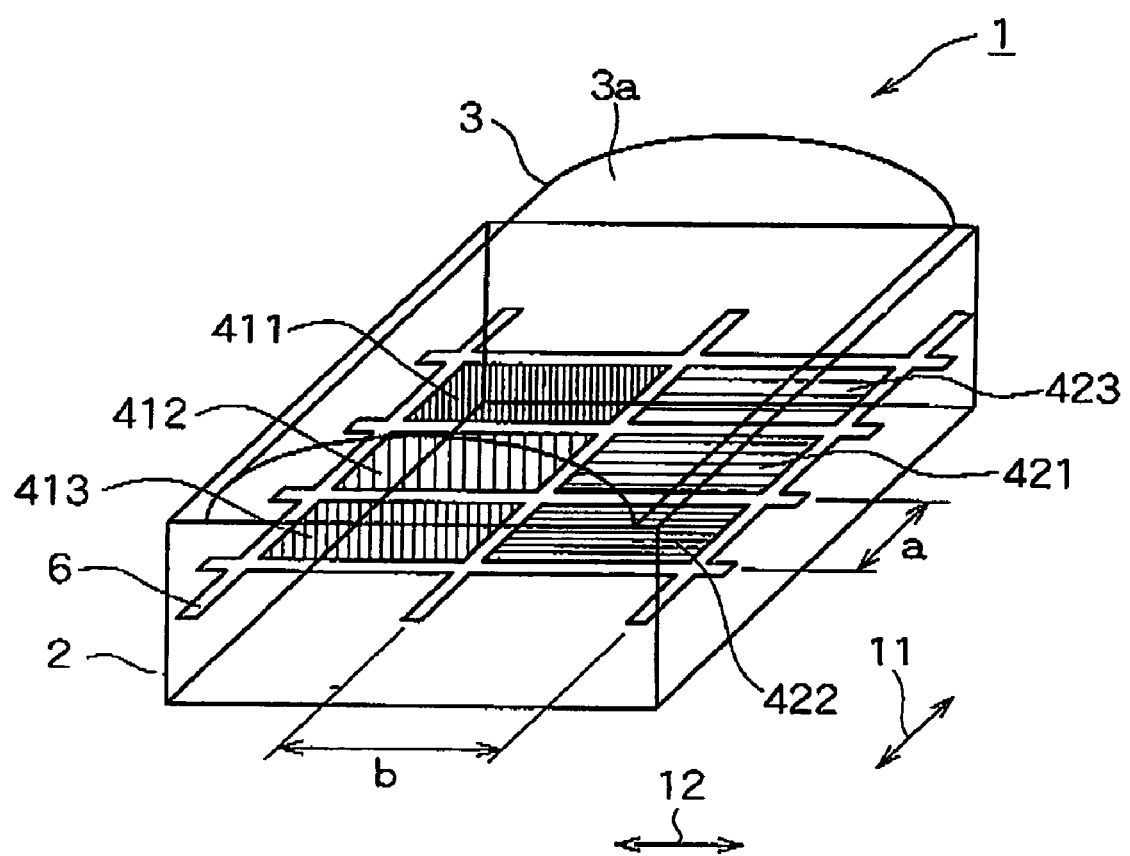
FIG. 17 is a perspective view illustrating an image display device according to a fourth embodiment of the invention.
Figure 18:
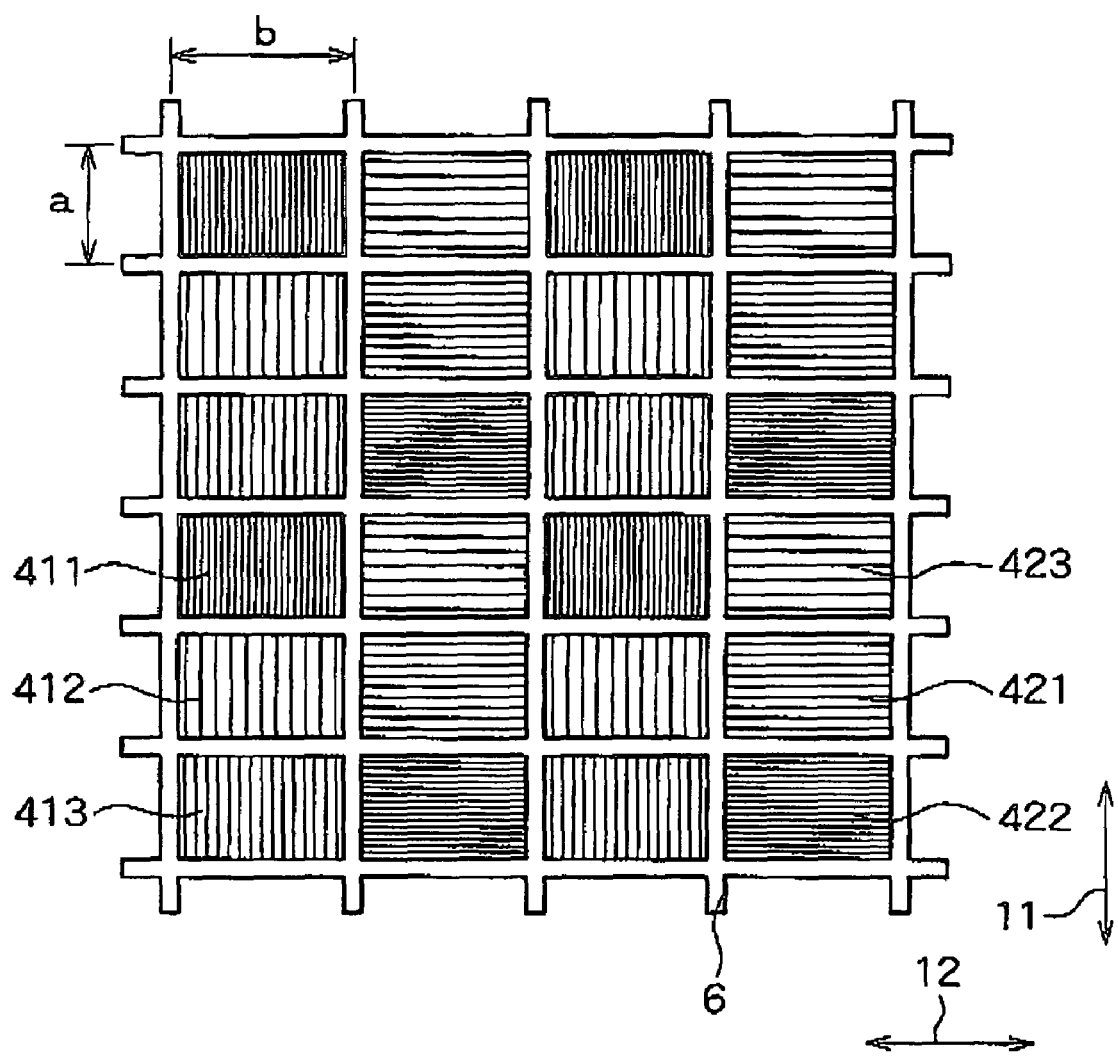
FIG. 18 is a top view illustrating a pitch of sub-pixels arranged in the display device.

Subsequently, a fourth embodiment of the invention will be explained below. FIG. 17 is a perspective view illustrating an image display device according to the embodiment and FIG. 18 is a top view illustrating a pitch of sub-pixels arranged in the display device. As shown in FIGS. 13 and 14, the embodiment is different from the aforementioned third embodiment in how primary color sub-pixels are arranged within a display pixel. Although the aforementioned third embodiment has, as shown in FIG. 16, the same color sub-pixels arranged in a line in the horizontal direction 12, the embodiment has, as exemplarily shown in FIGS. 13 and 14, a red sub-pixel 411 for left eye and a blue sub-pixel 423 for right eye are arranged in a line in the horizontal direction 12, a green sub-pixel 412 for left eye and a red sub-pixel 421 for right eye are arranged in a line in the horizontal direction 12, and a blue sub-pixel 413 for left eye and a green sub-pixel 422 for right eye are arranged in a line in the horizontal direction 12. That is, the sub-pixels corresponding to the individual colors are arranged in a mosaic pattern. Moreover, a positional relationship between the sub-pixels is the same relative to a central axis of a cylindrical lens 3a of a lenticular lens 3 and three sub-pixels are arranged adjacent to one another to form a set of primary color sub-pixels with primary colors, red, blue and green.

The embodiment and the aforementioned third embodiment are different from each other in that the primary color sub-pixels of the third embodiment are arranged in a stripe pattern and the primary color sub-pixels of the embodiment are arranged in a mosaic pattern, allowing the display device of the embodiment to be suited to display an image of natural scene, etc. The configuration, operation and beneficial effects of the embodiment other than the above-described configuration, operation and beneficial effects are similar to those of the aforementioned third embodiment.

It should be noted that color arrangement employed in the embodiment is only an example and the invention is in no way limited to the order observed in the above color arrangement. Furthermore, the invention is not limited to the three-dimensional display device allowing view from two view points, but may be applied to a display device allowing view from N (N is an integer not less than 3) number of view points.

Fifth Embodiment

Figure 19:
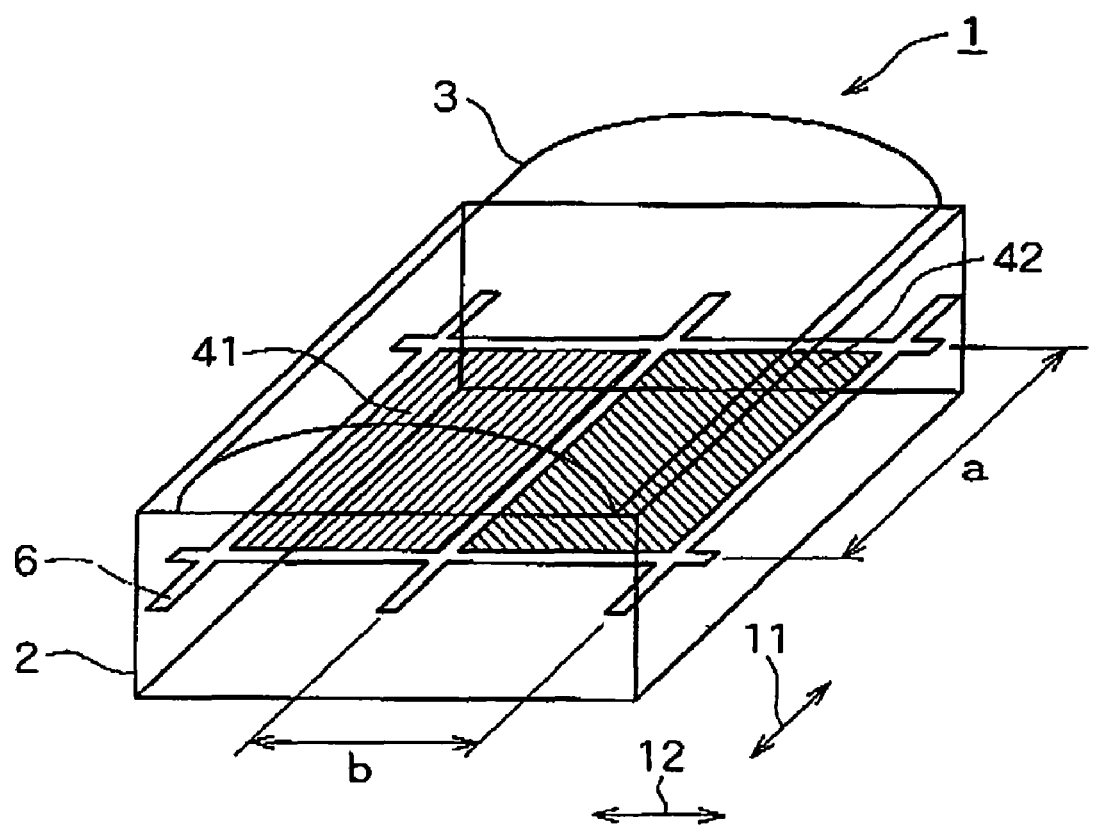
FIG. 19 is a perspective view illustrating an image display device according to a fifth embodiment of the invention.
Figure 20:
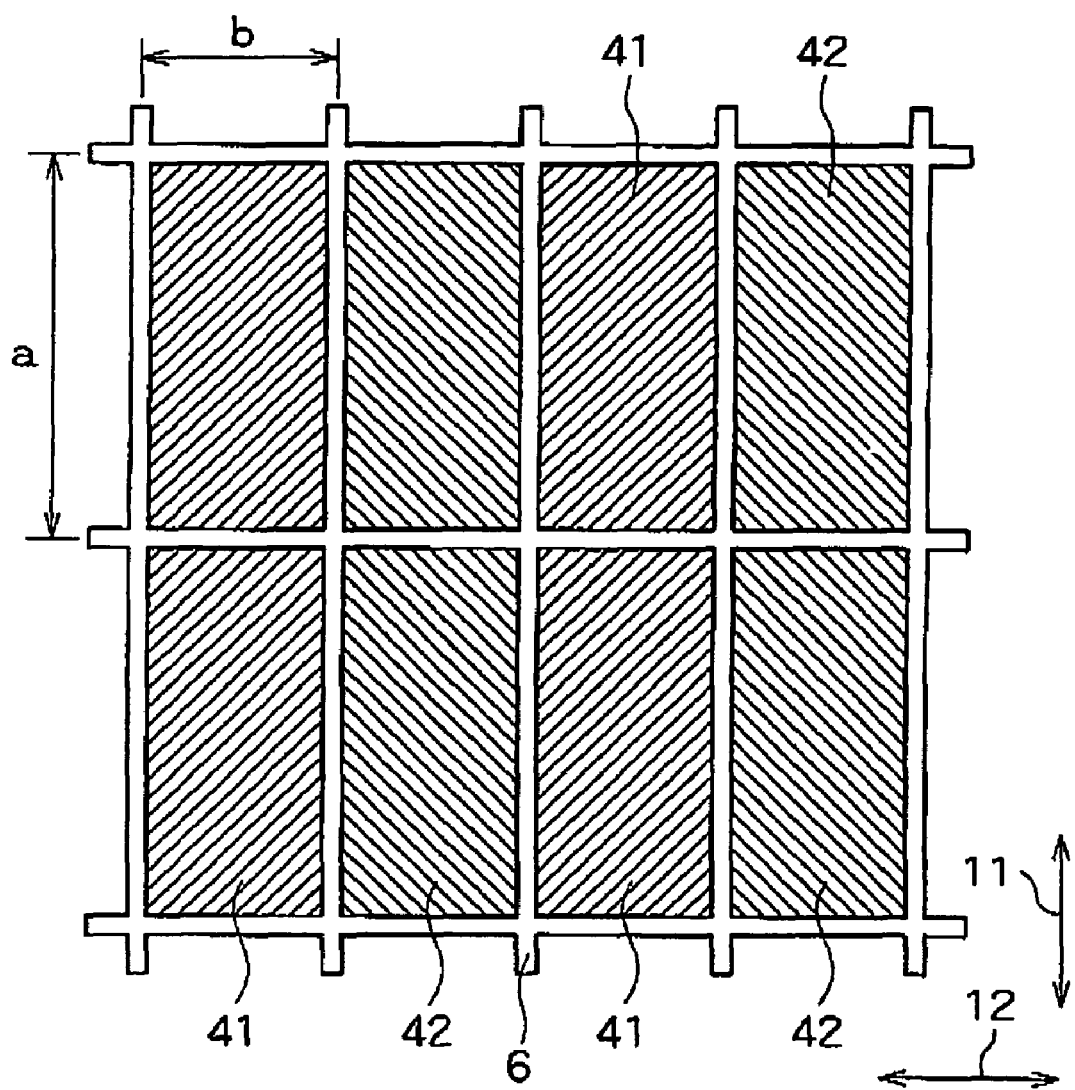
FIG. 20 is a top view illustrating a pitch of sub-pixels arranged in the display device.

Subsequently, a fifth embodiment of the invention will be explained below. FIG. 19 is a perspective view illustrating an image display device according to the embodiment and FIG. 20 is a top view illustrating a pitch of sub-pixels arranged in the display device. The embodiment is different from the aforementioned first embodiment in that in the embodiment, a pitch a of sub-pixels arranged in the longitudinal direction (vertical direction 11) of lenticular lens and a pitch b of the sub-pixels arranged in a direction (horizontal direction 12) orthogonal to the longitudinal direction of lenticular lens do not satisfy the aforementioned expression 10, but satisfy the following expression 34. Note that a pitch L of a lenticular lens and a pitch P of sub-pixels take on the values determined by the aforementioned expressions 11 to 19. The configuration and operation of the embodiment other than the above-described configuration and operation are similar to those of the aforementioned first embodiment.

$$a:b=L:P \quad \text{(Expression 34)}$$

As shown in FIGS. 15 and 16, since an observer views the sub-pixels through the lenticular lens 3, the length of sub-pixel in the horizontal direction 12 appears magnified by the lenticular lens 3 to (L/P)×b. On the other hand, the apparent length of sub-pixel in the vertical direction 11 is kept unchanged and equal to a. In the embodiment, the pitch of the sub-pixels arranged satisfies the aforementioned expression 34 and therefore the apparent length a of sub-pixel in the longitudinal direction 11 becomes equal to the apparent length (L/P)×b of sub-pixel in the horizontal direction 12. As a result, the display pixel is allowed to appear as a perfect square when the observer views a display panel 2 through the lenticular lens 3. This further improves the visibility of an image to be displayed and improves especially and significantly the visibility of a character to be displayed. Beneficial effects of the embodiment other than the above-described beneficial effects are similar to those of the first embodiment.

Sixth Embodiment

Figure 21:
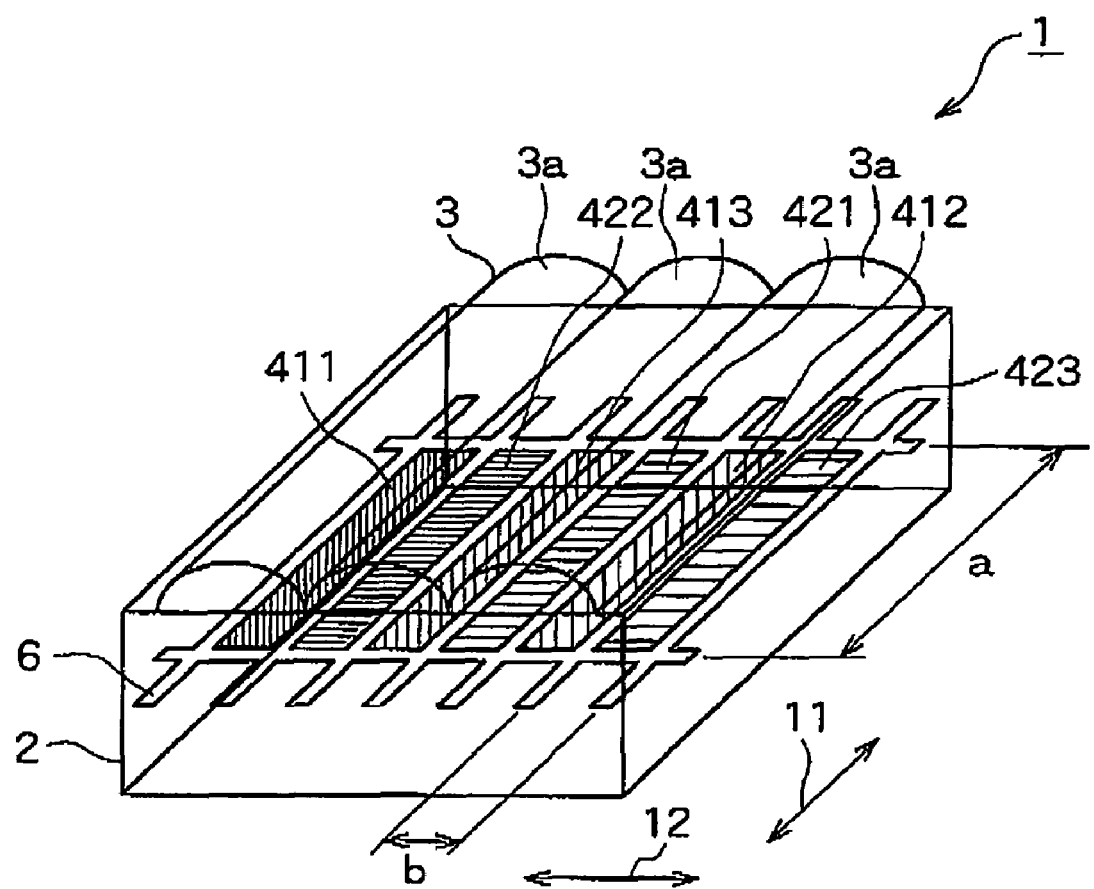
FIG. 21 is a perspective view illustrating an image display device according to a sixth embodiment of the invention.
Figure 22:
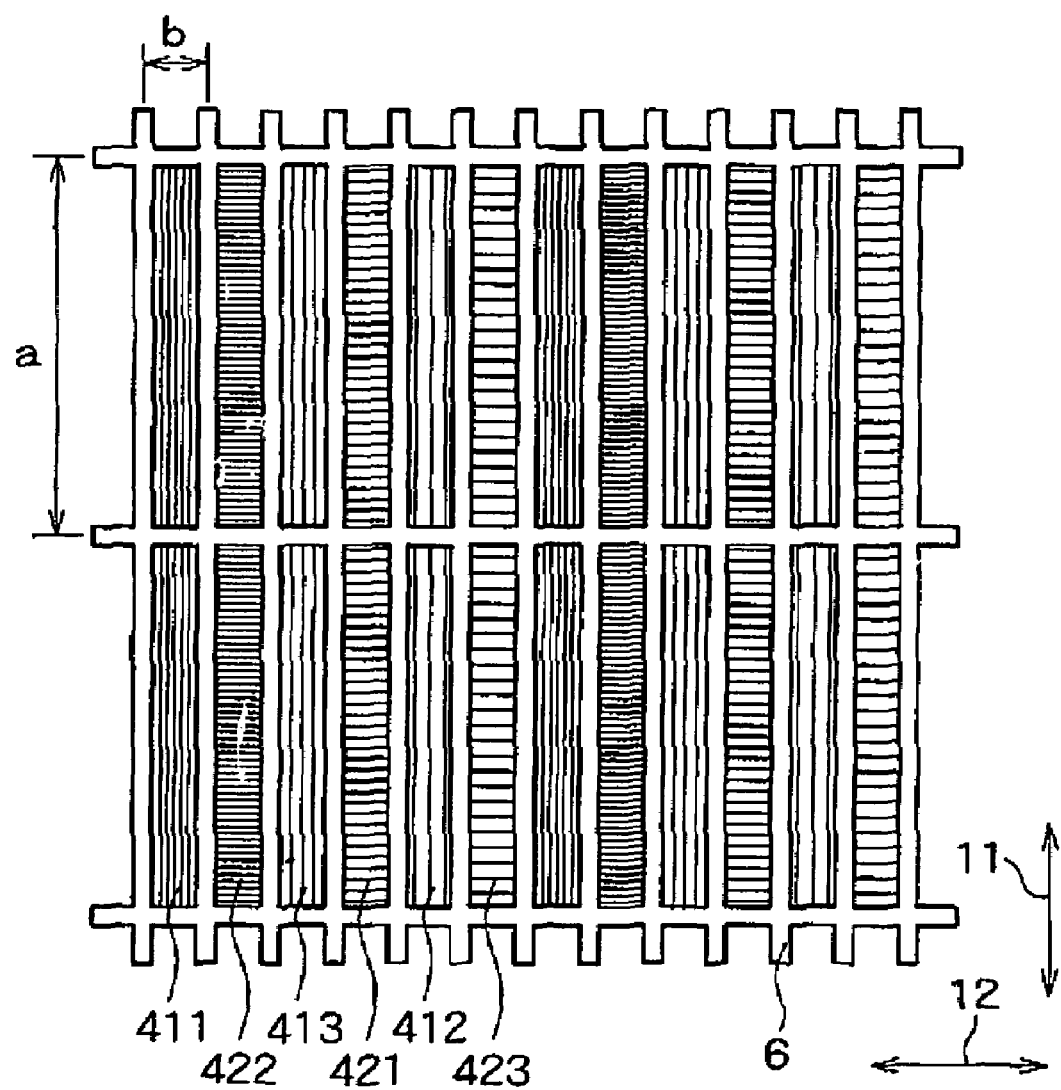
FIG. 22 is a top view illustrating a pitch of sub-pixels arranged in the display device.

Subsequently, a sixth embodiment of the invention will be explained below. FIG. 21 is a perspective view illustrating an image display device according to the embodiment and FIG. 22 is a top view illustrating a pitch of sub-pixels arranged in the display device. The embodiment is different from the aforementioned second embodiment in that in the embodiment, a pitch a of the sub-pixels arranged in the longitudinal direction (vertical direction 11) of lenticular lens and a pitch b of the sub-pixels arranged in a direction (horizontal direction 12) orthogonal to the longitudinal direction of lenticular lens do not satisfy the aforementioned expression 32, but satisfy the following expression 35. The configuration of the embodiment other than the above-described configuration is similar to that of the aforementioned second embodiment.

$$a:b = 3 \times L:P \quad \text{(Expression 35)}$$

As shown in FIGS. 17 and 18, since an observer views sub-pixels through a lenticular lens 3, the length of sub-pixel in the horizontal direction 12 appears magnified by the lenticular lens 3 to $(L/P) \times b$. Furthermore, since one display pixel has the sub-pixels of three colors arranged in the horizontal direction 12, the apparent length of display pixel in the horizontal direction 12 is equal to $3 \times (L/P) \times b$. On the other hand, the apparent length of sub-pixel in the vertical direction 11 is kept unchanged, i.e., is equal to a and since one display pixel has one sub-pixel disposed along the vertical direction 11, the apparent length of display pixel in the vertical direction 11 also is equal to a. In the embodiment, since the pitch of sub-pixels arranged satisfies the aforementioned expression 35, the apparent length a of display pixel in the vertical direction 11 becomes equal to the apparent length $3 \times (L/P) \times b$ of display pixel in the horizontal direction 12. As a result, when sub-pixels are arranged as shown in FIGS. 17, 18 and an observer views the display panel 2 through the lenticular lens 3, the display pixel is allowed to appear as a perfect square. This further enhances the visibility of an image to be displayed and in particular, significantly enhances the visibility of a character to be displayed. Beneficial effects of the embodiment other than the above-described beneficial effects are similar to those of the aforementioned second embodiment.

Seventh Embodiment

Figure 23:
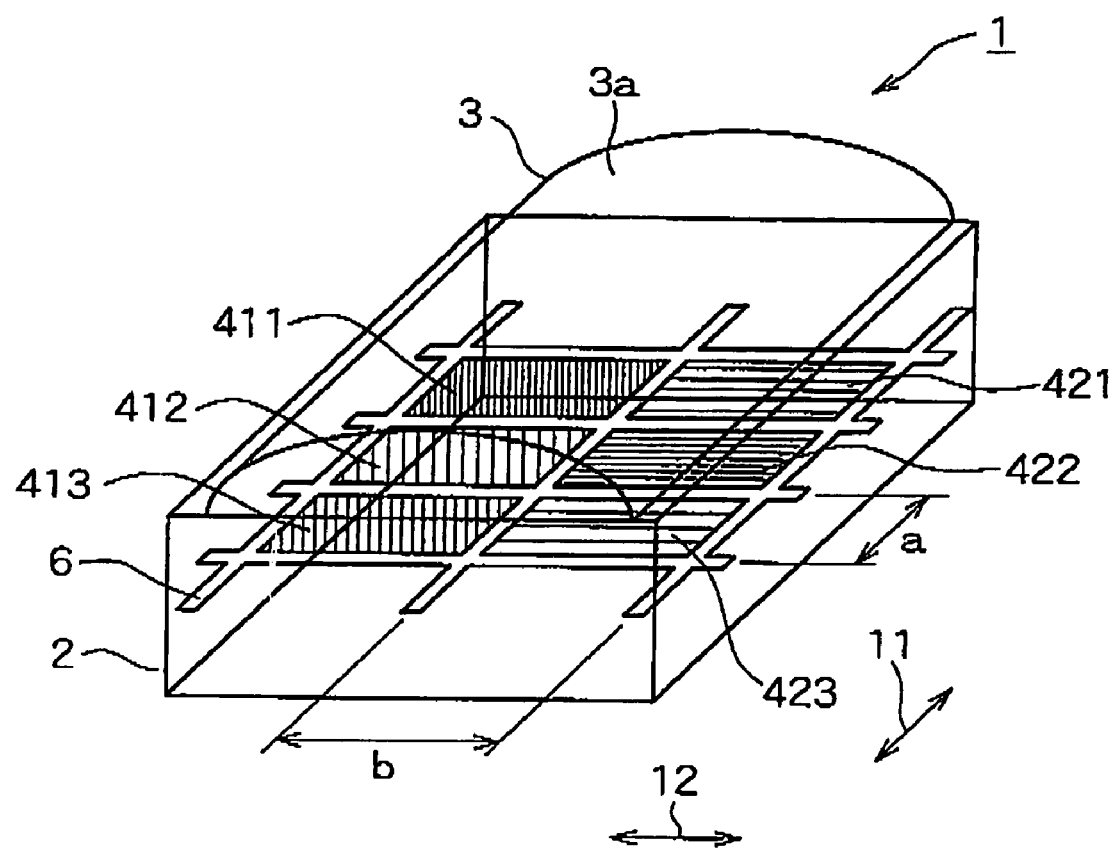
FIG. 23 is a perspective view illustrating an image display device according to a seventh embodiment of the invention.
Figure 24:
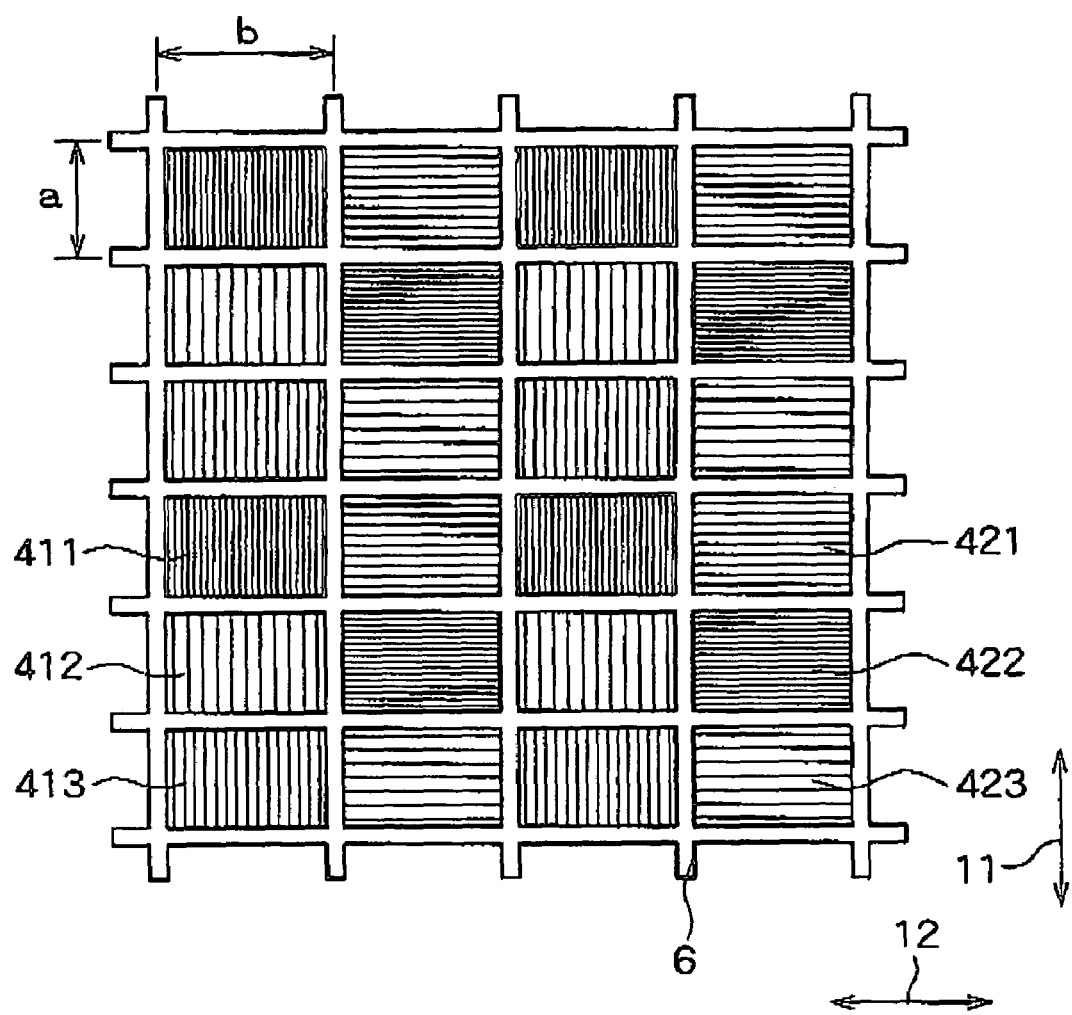
FIG. 24 is a top view illustrating a pitch of sub-pixels arranged in the display device.

Subsequently, a seventh embodiment of the invention will be explained below. FIG. 23 is a perspective view illustrating an image display device according to the embodiment and FIG. 24 is a top view illustrating a pitch of sub-pixels arranged in the display device. The embodiment is different from the aforementioned third embodiment in that in the embodiment, a pitch a of sub-pixels arranged in the longitudinal direction of lenticular lens and a pitch b of the sub-pixels arranged in a direction orthogonal to the longitudinal direction of lenticular lens do not satisfy the above-described expression 33, but satisfy the following expression 36. Note that a pitch L of cylindrical lenses of lenticular lens and a pixel-pitch P of sub-pixels take on the values determined by the aforementioned expression 11 to 19. The configuration and operation of the embodiment other than the above-described configuration and operation are similar to those of the aforementioned third embodiment.

$$a:b = L/3:P \quad \text{(Expression 36)}$$

As shown in FIGS. 19 and 20, since an observer views sub-pixels through a lenticular lens 3, the length of sub-pixel in a horizontal direction 12 appears magnified by the lenticular lens 3 to $(L/P) \times b$. Furthermore, since one display pixel has two sub-pixel arranged in the horizontal direction 12, the apparent length of display pixel in the horizontal direction 12 also is equal to $(L/P) \times b$. On the other hand, the apparent length of sub-pixel in the vertical direction 11 is kept unchanged, i.e., is equal to a and since one display pixel has three sub-pixels of three colors' arranged in the vertical direction 11, the apparent length of display pixel in the vertical direction 11 is equal to $3 \times a$. In the embodiment, since the pitch of the sub-pixels arranged satisfies the aforementioned expression 36, the apparent length $3 \times a$ of display pixel in the vertical direction 11 becomes equal to the apparent length $(L/P) \times b$ of display pixel in the horizontal direction 12. As a result, when sub-pixels are arranged as shown in FIGS. 19, 20 and an observer views the display panel 2 through the lenticular lens 3, the display pixel is allowed to appear as a perfect square. This further enhances the visibility of an image to be displayed and in particular, significantly enhances the visibility of a character to be displayed. Beneficial effects of the embodiment other than the above-described beneficial effects are similar to those of the aforementioned third embodiment.

It should be noted that as is the case with the aforementioned fourth embodiment, the embodiment may be configured so that the sub-pixels having the same color are arranged in a mosaic pattern in the display panel 2.

Eighth Embodiment

Figure 25:
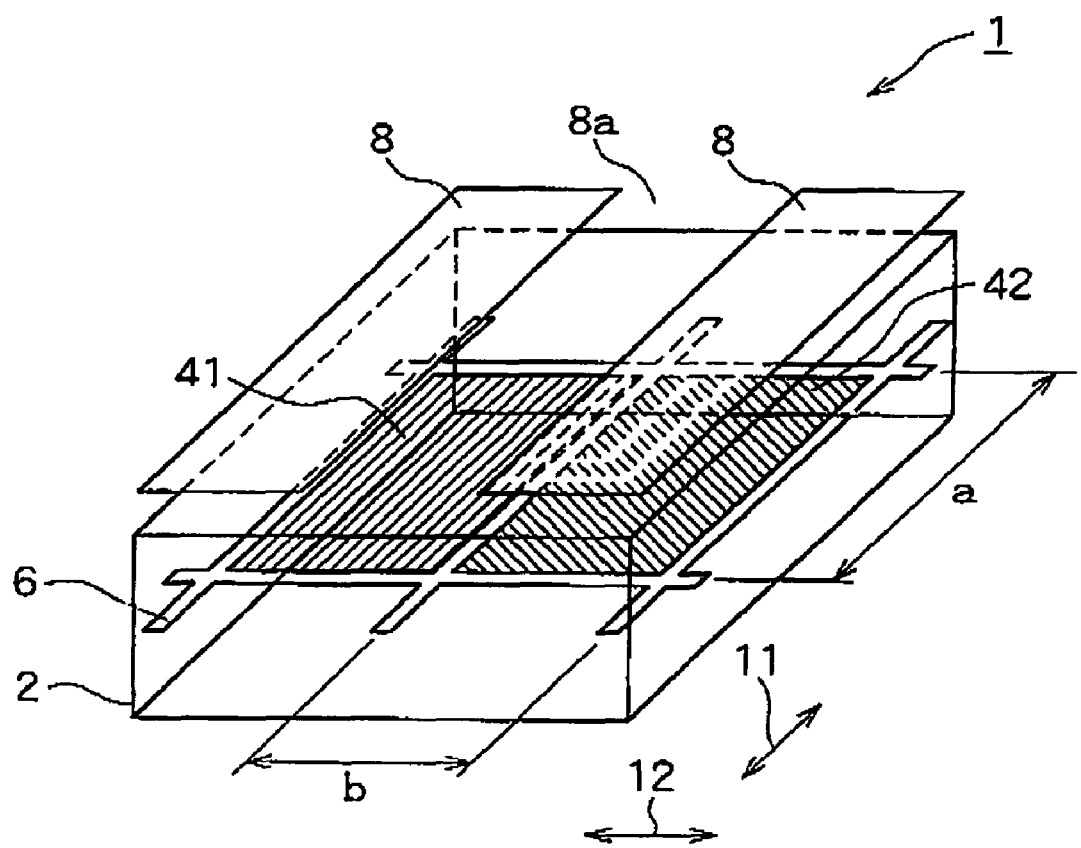
FIG. 25 is a perspective view illustrating an image display device according to an eighth embodiment of the invention.

Subsequently, an eighth embodiment of the invention will be explained below. FIG. 25 is a perspective view illustrating an image display device according to the embodiment. Furthermore, a top view illustrating a pitch of sub-pixels arranged in the display device is the same as that shown in FIG. 7. As shown in FIG. 25, the embodiment is different from the aforementioned first embodiment in that a parallax barrier 8 is provided instead of lenticular lens. The configuration of the embodiment other than the above-described configuration is similar to that of the aforementioned first embodiment.

Figure 1:
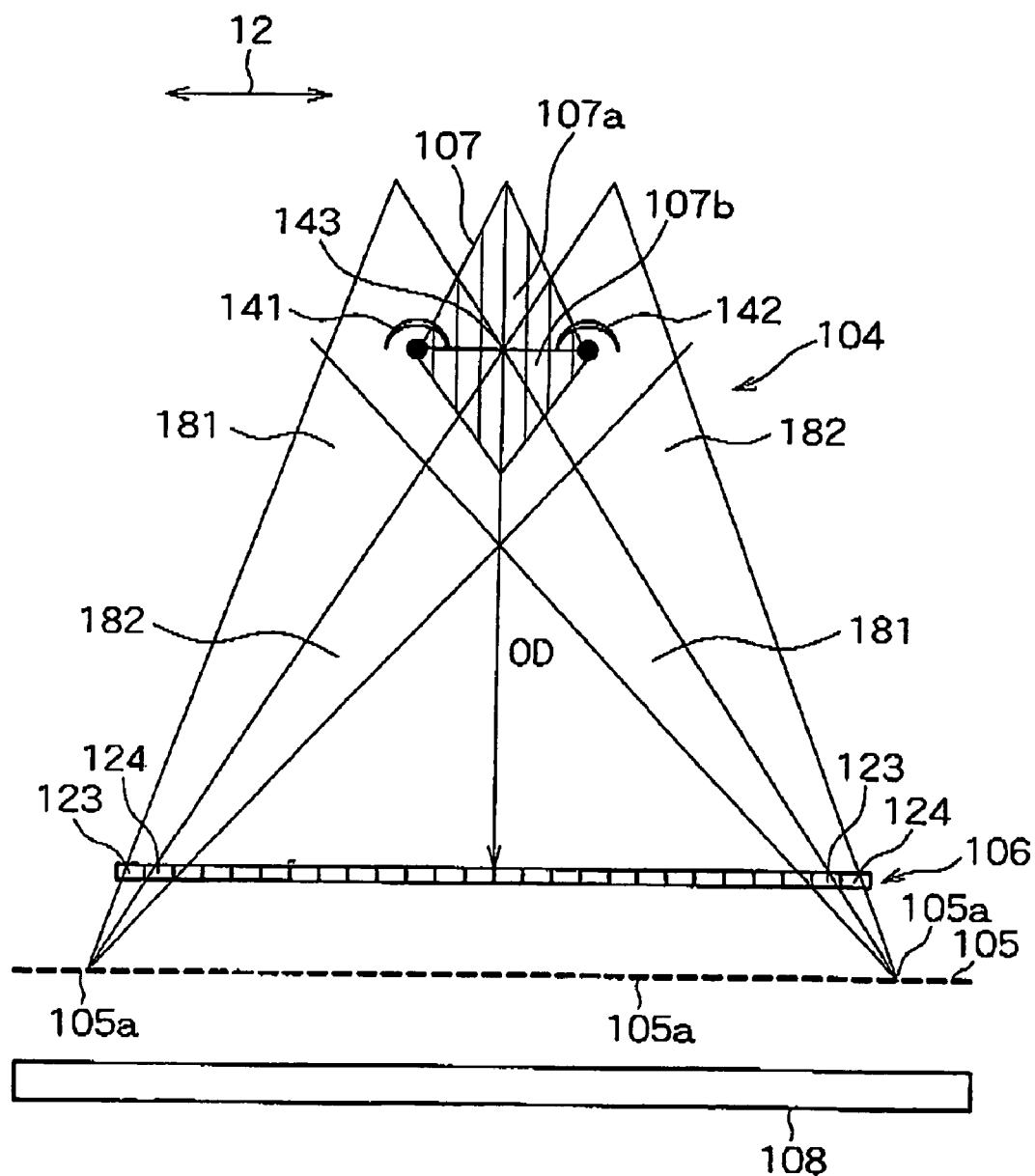
FIG. 1 is an optical model diagram illustrating a three-dimensional image display method using a parallax barrier.
Figure 2:
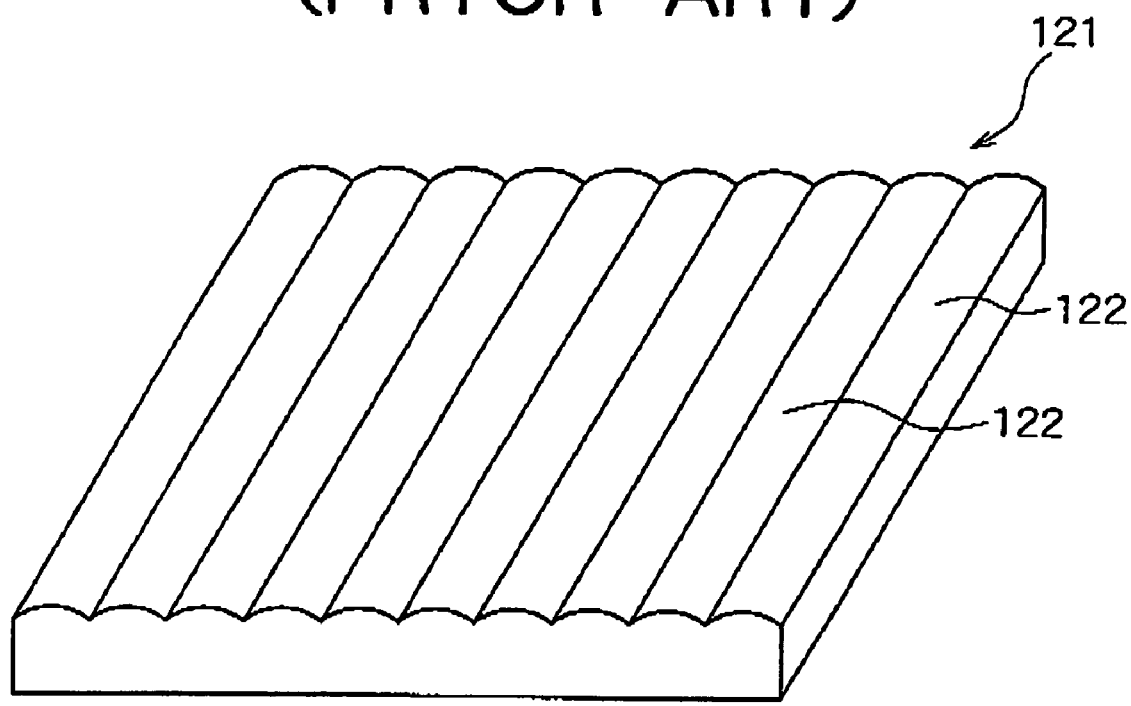
FIG. 2 is a perspective view illustrating a lenticular lens.
Figure 3:
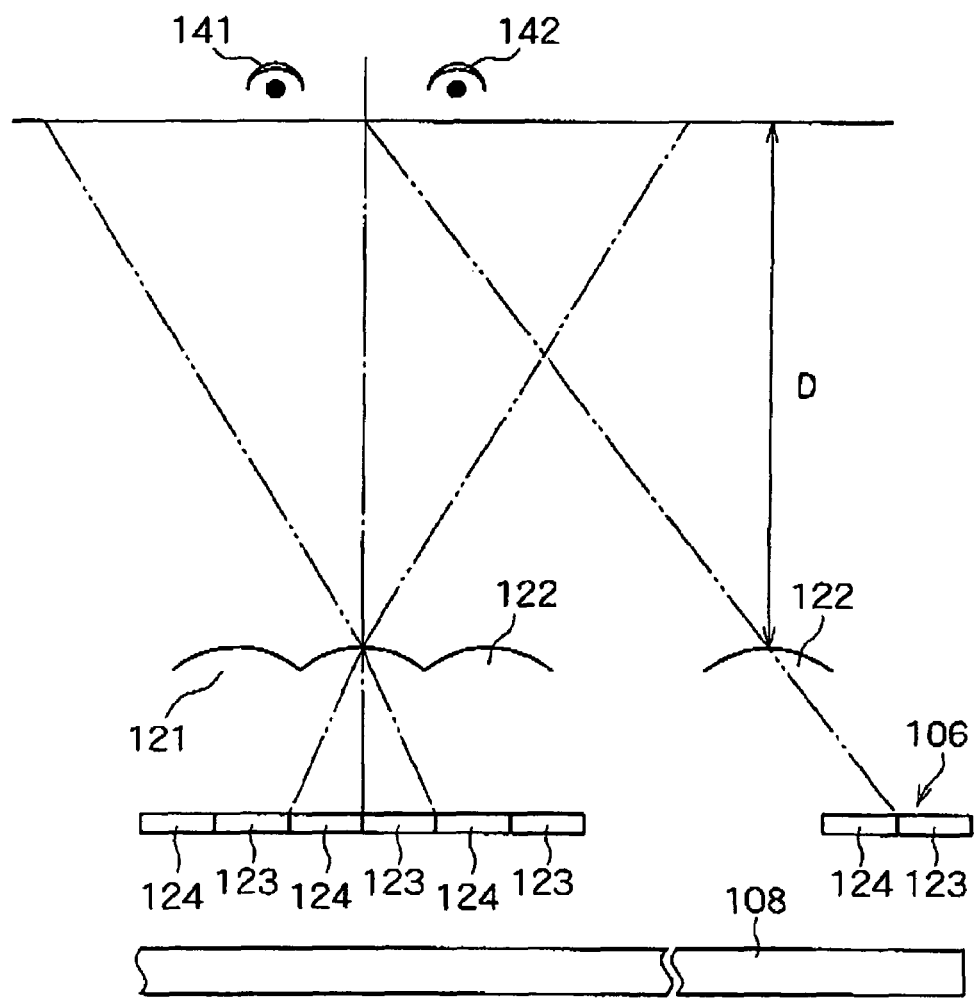
FIG. 3 shows an optical model illustrating a three-dimensional display method using a lenticular lens.
Figure 4:
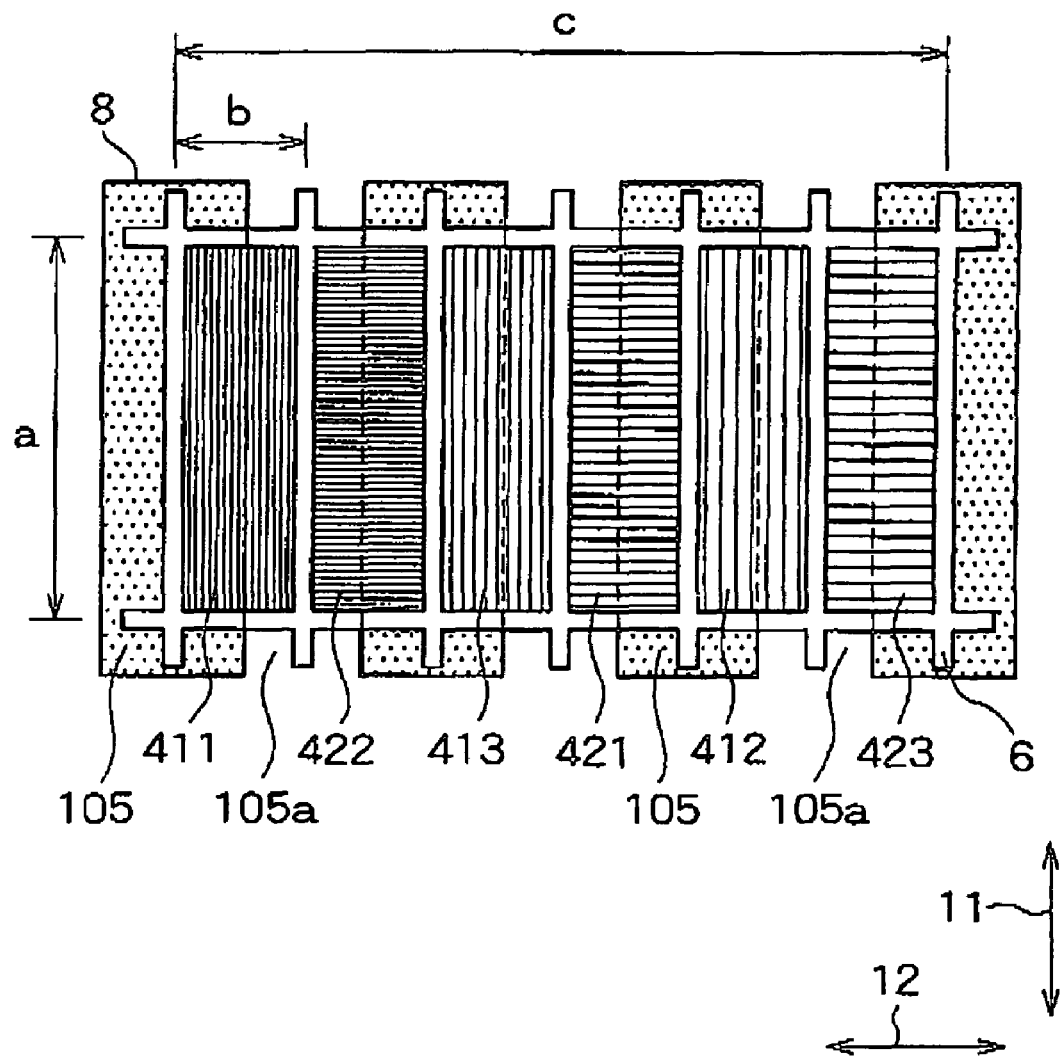
FIG. 4 is a top view illustrating sub-pixels in the conventional three-dimensional image display device.

Then, how a three-dimensional display device of the embodiment operates will be explained with reference to FIGS. 21 and 4. AS shown in FIG. 25, a light source (not shown) emits light and the light enters a display panel 2. At this point, in the display panel 2, a left eye image is displayed by the aggregation of sub-pixels 41 for left eye and a right eye image is displayed by the aggregation of sub-pixels 42 for right eye. Then, the lights incident on the sub-pixel 41 for left eye and the sub-pixel 42 for right eye, both sub-pixels being provided in the display panel 2, transmit through those sub-pixels and propagate to the parallax barrier 8. Thereafter, those lights transmit through slits 8a of the parallax barrier 8 and exit the slits, and then, propagate to areas EL and ER (refer to FIG. 8), respectively. In this case, when an observer moves his/her eyes so that a left eye 61 is positioned in the area EL and a right eye 62 is positioned in the area ER, the left eye image is input to the left eye 61 and at the same time, the right eye image is input to the right eye 62. When a parallax exists between the left eye image and the right eye image, the observer is able to identify those images as a three-dimensional image. When no parallax exists between those images, the observer is able to identify the images as a two-dimensional image.

Since the embodiment employs the parallax barrier 8, the embodiment has an advantage over an example employing a lenticular lens in that a reduction in the quality of an image to be displayed, which reduction is caused by the pattern in the lens, never occurs. Beneficial effects of the embodiment other than the above-described beneficial effects are similar to those of the aforementioned first embodiment. Note that the aforementioned second to seventh embodiments also are able to employ a parallax barrier instead of lenticular lens.

In the description of the aforementioned first to eighth embodiments, an image display device has been explained as a three-dimensional image/two-dimensional image display device allowing view from two view points, i.e., a view point for left eye and a view point for right eye, and being capable of displaying both three-dimensional image and two-dimensional image. However, the image display device according to the invention is not limited to the above-described configuration, but may be an image display device allowing view from three or more view points and/or allowing an observer to view through his/her both eyes an image from the individual view points. Therefore, when one image display device displays images different from one another so that the images are viewed from view points different from one another and a plurality of observers view the image display device from angles different from one another, the plurality of observers are able to view the images different from one another. Furthermore, when one image display device displays images different from one another so that the images are viewed from view points different from one another and an observer changes his/her viewing angle, the observer is able to view a plurality of images by switching between views of the plurality of images. In the following description of a ninth embodiment of the invention, such an image display device is explained.

Ninth Embodiment

Figure 26:
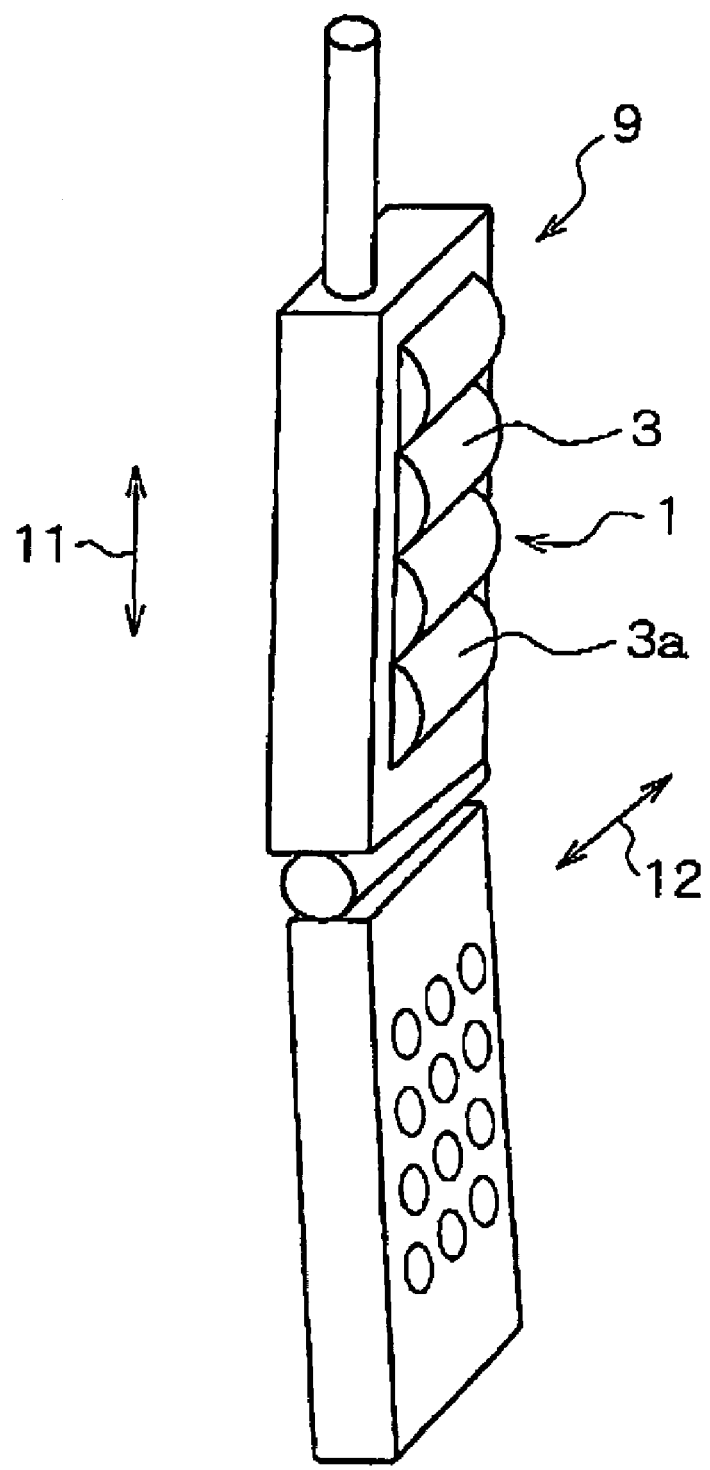
FIG. 26 is a perspective view illustrating a portable terminal device according to a ninth embodiment of the invention.
Figure 27:
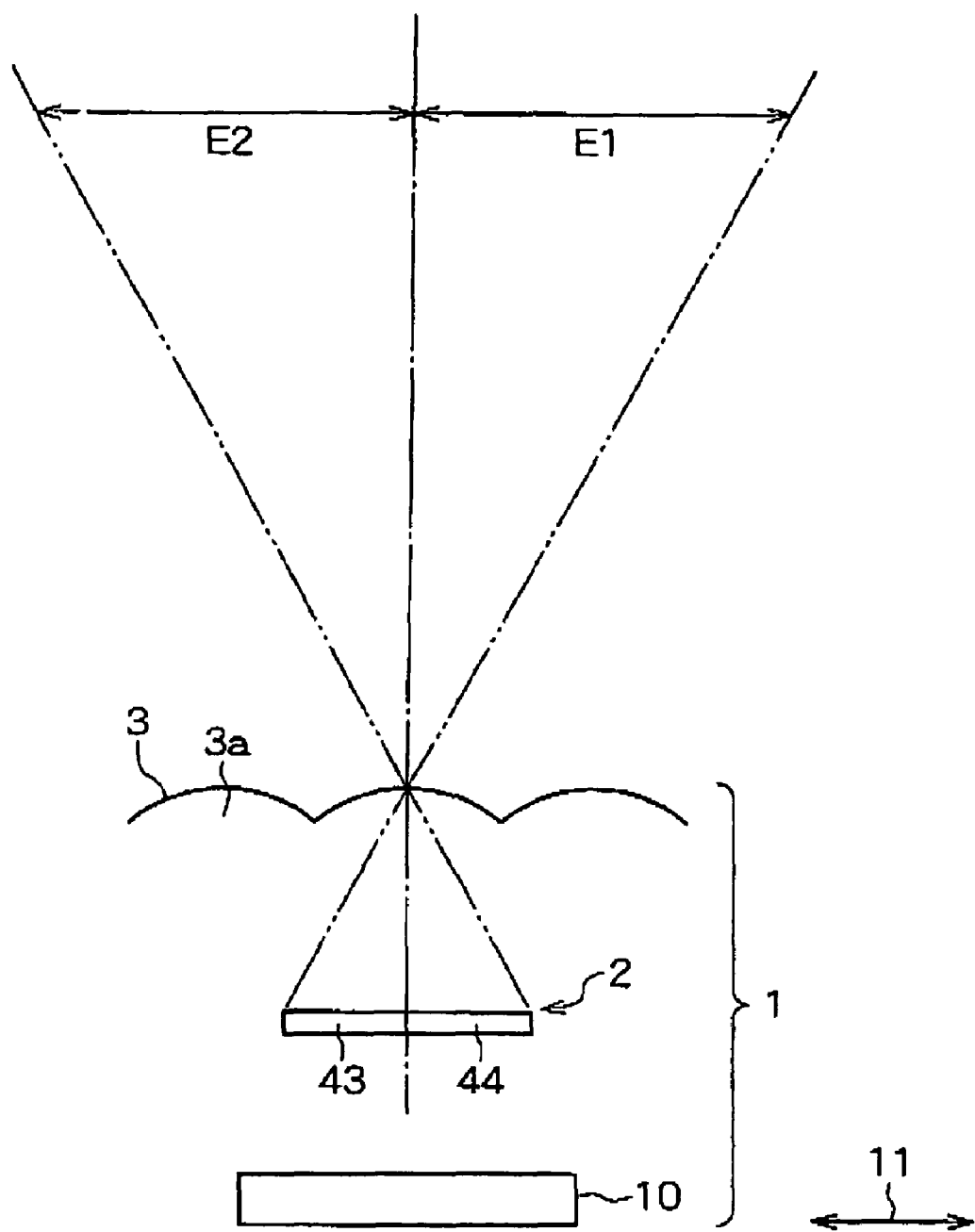
FIG. 27 shows an optical model illustrating how the image display device according to the embodiment operates.

Subsequently, a ninth embodiment of the invention will be explained below. FIG. 26 is a perspective view illustrating a portable terminal device according to the embodiment and FIG. 27 shows an optical model illustrating how an image display device according to the embodiment operates. As shown in FIG. 26, in the embodiment, an image display device is incorporated within a cellular phone 9 as a portable terminal device. Furthermore, the embodiment is different from the aforementioned first embodiment in that a direction in which cylindrical lenses 3a making up a lenticular lens 3 are arranged is a vertical direction 11, i.e., the vertical direction of an image to be displayed and the vertical direction of the cylindrical lens 3a is a horizontal direction 12, i.e., the horizontal direction of an image to be displayed. Moreover, as shown in FIG. 27, a direction in which a sub-pixel 43 for first view point and a sub-pixel 44 for second view point are arranged within one display pixel of a display panel 2 is the vertical direction 11 in which the cylindrical lenses 3a are arranged. Note that in FIG. 26, to simplify illustration, only four cylindrical lenses 3a are shown, however, actually, the cylindrical lenses 3a are provided so as to correspond to the number of display pixels arranged in the vertical direction 11. The configuration of the embodiment other than the above-described configuration is similar to that of the aforementioned first embodiment.

Then, how the image display device of the embodiment operates will be explained. As shown in FIG. 27, a light source 10 emits light and the light enters the display panel 2. In this case, in the display panel 2, an image for first view point is displayed by the sub-pixels 43 for first view point and an image for second view point is displayed by the sub-pixels 44 for second view point. Then, the lights incident on the sub-pixel 43 for first view point and the sub-pixel 44 for second view point, both sub-pixels being provided in the display panel 2, transmit through those sub-pixels and propagate to the lenticular lens 3. Thereafter, those lights are refracted by the cylindrical lens 3a of the lenticular lens 3 and exit the cylindrical lens 3a, and then, propagate to areas E1 and E2, respectively. The areas E1 and E2 are arranged along the vertical direction 11. In this case, when an observer moves his/her both eyes so that both eyes are positioned in the area E1, the observer is able to view the image for first view point and when the observer moves his/her eyes so that both eyes are positioned in the area E2, the observer is able to view the image for second view point.

In the embodiment, only changing the angle of the cellular phone 9 allows the observer to position his/her both eyes in the area E1 or E2 and thereby, advantageously permits the observer to view the image for first view point or the image for second view point. Particularly, when the image for first view point and the image for second view point are associated with each other, the observer is able to view the individual images simply by changing a viewing angle and therefore the cellular phone becomes highly convenient for a user. Note that when a plurality of images to be viewed from a plurality of view points are arranged in a distributed fashion in the horizontal direction and an observer is in a position from which the observer views images to be viewed from different view points through his/her left and right eyes, the observer is confused and cannot identify the images to be viewed from the individual view points. In contrast, as shown in the description of the embodiment, when a plurality of images to be viewed from a plurality of view points are arranged in a distributed fashion in the vertical direction, an observer is able to view images to be viewed from the individual view points through his/her both eyes without fail, allowing the observer to easily identify those images. Beneficial effects of the embodiment other than the above-described beneficial effects are similar to those of the aforementioned first embodiment. Note that the configuration of the embodiment can be applied also to the aforementioned second to eighth embodiments.

What is claimed is:

1. An image display device comprising:

a display panel which is to be viewed from N number of view points and includes a Plurality of display pixels arranged in a matrix, each display pixel have M×N (M and N each represent a natural number) number of sub-pixels, said M×N number of sub-pixels included in each of said display pixels being formed within a square area; and a lenticular lens for distributing light rays from said sub-pixels individually to said view points, and wherein said display panel is monochrome display panel and M represents 1, and wherein when assuming a pitch of said sub-pixels arranged in longitudinal direction along a ridge projection of said lenticular lens is a and a pitch of said sub-pixels arranged in a direction orthogonal to said longitudinal direction of said lenticular lens is b, an expression a:b=N:1 results.

2. An image display device comprising:

a display panel which is to be viewed from N number of view points and includes a plurality of display pixels arranged in a matrix, each display pixel having M×N (M and N each represent a natural number) number of sub-pixels, said M×N number of sub-pixels included in each of said display pixels being formed within a square area; and a lenticular lens for distributing light rays from said sub-pixels individually to said view points, and wherein said display panel is a color display panel comprising sub-pixels of three primary colors and M represents 3, and wherein when assuming a pitch of said sub-pixels arranged in a longitudinal direction along a ridge projection of said lenticular lens is a and a pitch of said sub-pixels arranged in a direction orthogonal to said longitudinal direction of said lenticular lens is b, and expression a:b=3×N:1 results.

3. An image display device comprising:

a display panel which is to be viewed from N number of view points and includes a plurality of display pixels arranged in a matrix, each display pixel having M×N (M and N each represent a natural number ) number of sub-pixels, said M×N number of sub-pixels included in each of said display pixels being formed within a square area; and a lenticular lens for distributing light rays from said sub-pixels individually to said view points, and wherein said display panel is a color display panel comprising sub-pixels of three primary colors and M represents 3, and wherein when assuming a pitch of said sub-pixels arranged in a longitudinal direction along a ridge projection of said lenticular lens is a and a pitch of said sub-pixels arranged in a direction orthogonal to said longitudinal direction of said lenticular lens is b, an expression a:b=N:3 results.

4. The image display device according to claim 3, wherein said primary color sub-pixels having the same color are arranged in a direction orthogonal to said longitudinal direction of said lenticular lens.

5. The image display device according to claim 3, wherein said primary color sub-pixels having the same color are arranged in a direction orthogonal to said longitudinal direction of said lenticular lens.

6. An image display device comprising:

a display panel which is to be viewed from N number of view points and includes a plurality of display pixels, each including N (N represents a natural number) number of sub-pixels; and a lenticular lens, said image display device being further constructed such that when assuming a pitch of a lens array in said lenticular lens is L, a pitch of said sub-pixels of said display pixel is P, a pitch of said sub-pixels arranged in a longitudinal direction along a ridge projection of said lenticular lens is a, and a pitch of said sub-pixels arranged in a direction orthogonal to said longitudinal direction of said lenticular lens is b, said pitches satisfy the following expression:

$$a:b=L:P.$$

7. The image display device according to claim 6, wherein said primary color sub-pixels having the same color are arranged in a direction orthogonal to said longitudinal direction of said lenticular lens.

8. The image display device according to claim 6, wherein a set of three sub-pixels having the same relative positional relationship to a central axis of said lenticular lens and positioned adjacent one another constitutes primary color sub-pixels with primary colors, red, blue and green.

9. The image display device according to claim 6, wherein a focal distance of said lenticular lens and a distance between an apex of said lens and said pixel are different from each other.

10. The image display device according to claim 6, wherein said longitudinal direction along said ridge projection of said lenticular lens is a horizontal direction of an image to be displayed.

11. The image display device according to claim 6, wherein said display pixel is configured so that said display pixel is to be viewed from two view points and comprises a sub-pixel for left eye and a sub-pixel for right eye, wherein an image for left eye and an image for right eye are displayed by sub-pixels for left eye and sub-pixels for right eye, respectively, and wherein at the time of display of three-dimensional image, images with parallax are displayed by said sub-pixels for left eye and said sub-pixels for right eye, and wherein at the time of display of two-dimensional image, the same images are displayed by said sub-pixels for left eye and said sub-pixels for right eye.

12. The image display device according to claim 6, wherein said display panel is a liquid crystal display panel.

13. A portable terminal device comprising said image display device described in claim 6.

14. The portable terminal device according to claim 13, wherein said portable terminal device is a cellular phone, portable terminal, PDA, game machine, digital camera or digital video camera.

15. An image display device comprising:

a display panel which is to be viewed from N number of view points and includes a plurality of display pixels, each including 3×N (N represents a natural number) number of primary color sub-pixels; and a lenticular lens, said image display device being further constructed such that when assuming a pitch of a lens array in said lenticular lens is L, a pitch of said sub-pixels of said display pixel is P, a pitch of said sub-pixels arranged in a longitudinal direction along a ridge projection of said lenticular lens is a, and a pitch of said sub-pixels arranged in a direction orthogonal to said longitudinal direction of said lenticular lens is b, said pitches satisfy the following expression:

$$a:b=3×L:P.$$

16. The image display device according to claim 15, wherein a focal distance of said lenticular lens and a distance between an apex of said lens and said pixel are different from each other.

17. The image display device according to claim 15, wherein said longitudinal direction along said ridge projection of said lenticular lens is a horizontal direction of an image to be displayed.

18. The image display device according to claim 15, wherein said display pixel is configured so that said display pixel is to be viewed from two view points and comprises a sub-pixel for left eye and a sub-pixel for right eye, wherein an image for left eye and an image for right eye are displayed by sub-pixels for left eye and sub-pixels for right eye, respectively, and wherein at the time of display of three-dimensional image, images with parallax are displayed by said sub-pixels for left eye and said sub-pixels for right eye, and wherein at the time of display of two-dimensional image, the same images are displayed by said sub-pixels for left eye and said sub-pixels for right eye.

19. The image display device according to claim 15, wherein said display panel is a liquid crystal display panel.

20. A portable terminal device comprising said image display device described in claim 15.

21. The portable terminal device according to claim 20, wherein said portable terminal device is a cellular phone, portable terminal, PDA, game machine, digital camera or digital video camera.

22. An image display device comprising:
a display panel which is to be viewed from N number of view points and includes a plurality of display pixels, each including 3×N (N represents a natural number) number of primary color sub-pixels; and
a lenticular lens,
said image display device being further constructed such that when assuming a pitch of a lens array in said lenticular lens is L, a pitch of said sub-pixels of said display pixel is P, a pitch of sub-pixels arranged in a longitudinal direction along a ridge projection of said lenticular lens is a, and a pitch of said sub-pixels arranged in a direction orthogonal to said longitudinal direction of said lenticular lens is b, said pitches satisfy the following expression:

$a{:}b{=}L/3{:}P$.

23. The image display device according to claim 22, wherein a focal distance of said lenticular lens and a distance between an apex of said lens and said pixel are different from each other.

24. The image display device according to claim 22, wherein said longitudinal direction along said ridge projection of said lenticular lens is a horizontal direction of an image to be displayed.

25. The image display device according to claim 22, wherein said display pixel is configured so that said display pixel is to be viewed from two view points and comprises a sub-pixel for left eye and a sub-pixel for right eye, wherein an image for left eye and an image for right eye are displayed by sub-pixels for left eye and sub-pixels for right eye, respectively, and wherein at the time of display of three-dimensional image, images with parallax are displayed by said sub-pixels for left eye and said sub-pixels for right eye, and wherein at the time of display of two-dimensional image, the same images are displayed by said sub-pixels for left eye and said sub-pixels for right eye.

26. The image display device according to claim 22, wherein said display panel is a liquid crystal display panel.

27. A portable terminal device comprising said image display device described in claim 22.

28. The portable terminal device according to claim 27, wherein said portable terminal device is a cellular phone, portable terminal, PDA, game machine, digital camera or digital video camera.

29. An image display device comprising:
a display panel which is to be viewed from N number of view points and includes a plurality of display pixels arranged in a matrix, each display pixel having M×N (M and N each represent a natural number) number of sub-pixels, said M×N number of sub-pixels included in each of said display pixels being formed within a square area; and
a parallax barrier for distributing light rays from said sub-pixels individually to said view points,
wherein said display panel is a monochrome display panel and M represents 1, and wherein when assuming a pitch of said sub-pixels arranged in a longitudinal direction of a slit opening of said parallax barrier is a and a pitch of said sub-pixels arranged in a direction orthogonal to said longitudinal direction of said slit opening is b, said pitches satisfy the following expression:

$a{:}b{=}N{:}1$.

30. An image display device comprising:
a display panel which is to be viewed from N number of view points and includes a plurality of display pixels arranged in a matrix, each display pixel having M×N (M and N each represent a natural number) number of sub-pixels, said M×N number of sub-pixels included in each of said display pixels being formed within a square area; and
a parallax barrier for distributing light rays from said sub-pixels individually to said view points,
wherein said display panel is a color display panel comprising sub-pixels of three primary colors and M represents 3, and wherein when assuming a pitch of sub-pixels arranged in a longitudinal direction of a slit opening of said parallax barrier is a and a pitch of said sub-pixels arranged in a direction orthogonal to said longitudinal direction of said slit opening is b, said pitches satisfy the following expression:

$a{:}b{=}3{\times}N{:}1$.

31. An image display device comprising:
a display panel which is to be viewed from N number of view points and includes a plurality of display pixels arranged in a matrix, each display pixel having M×N (M and N each represent a natural number) number of sub-pixels, said M×N number of sub-pixels included in each of said display pixels being formed within a square area; and
a parallax barrier for distributing light rays from said sub-pixels individually to said view points
wherein said display panel is a color display panel comprising sub-pixels of three primary colors and M represents 3, and wherein when assuming a pitch of said sub-pixels arranged in a longitudinal direction of a slit opening of said parallax barrier is a and a pitch of said sub-pixels arranged in a direction orthogonal to said longitudinal direction of said slit opening is b, said pitches satisfy the following expression:

$a{:}b{=}N{:}3$.

32. The image display device according to claim 31, wherein primary color sub-pixels having the same color are arranged in a direction orthogonal to said longitudinal direction of said slit opening.

33. The image display device according to claim 31, wherein a set of three sub-pixels having the same relative positional relationship to a center line of said slit opening and positioned adjacent one another constitutes primary color sub-pixels with primary colors, red, blue and green.

34. The image display device according to claim 31, wherein said longitudinal direction of said slit opening of said parallax barrier is a horizontal direction of an image to be displayed.

35. An image display device comprising:
a display panel which is to be viewed from N number of view points and includes a plurality of display pixels arranged in a matrix, each display pixel having M×N (M and N each represent a natural number) number of sub-pixels, said M×N number of sub-pixels included in each of said display pixels being formed within a square area; and
a lenticular lens for distributing light rays from said sub-pixels individually to said view points, and wherein said display pixels configured so that said display pixel is to be viewed from two view points and comprises a sub-pixel for left eye and a sub-pixel for right eye, wherein an image for left eye and an image for right eye are displayed by sub-pixels for left eye and sub-pixels for right eye, respectively, and wherein at the time of display of three-dimensional image, images with parallax are displayed by said sub-pixels for left eye and said sub-pixels for right eye, and wherein at the time of display of two-dimensional image, the same images are displayed by said sub-pixels for left eye and said sub-pixels for right eye.

36. An image display device comprising:

a display panel which is to be viewed from N number of view points and includes a plurality of display pixels arranged in a matrix, each display pixel having M×N (M and N each represent a natural number) number of sub-pixels, said M×N number of sub-pixels included in each of said display pixels being formed within a square area; and a lenticular lens for distributing light rays from said sub-pixels individually to said view points, and wherein a focal distance of said lenticular lens and a distance between an apex of said lens and said pixel are different from each other, and wherein said display pixel is configured so that said display pixel is to be viewed from two view points and comprises a sub-pixel for left eye and a sub-pixel for right eye, wherein an image for left eye and an image for right eye are displayed by said sub-pixels for left eye and sub-pixels for right eye, respectively, and wherein at the time of display of three-dimensional image, images with parallax are displayed by said sub-pixels for left eye and said sub-pixels for right eye, and wherein at the time of display of two-dimensional image, the same images are displayed by said sub-pixels for left eye and said sub-pixels for right eye.

37. A display panel comprising a plurality of display pixels arranged in a matrix, each display pixel being to be viewed from N view points and including N (N represents a natural number) number of sub-pixels, wherein said display panel is a monochrome display panel and when assuming a pitch of said sub-pixels arranged in one direction is a and a pitch of said sub-pixels arranged in a direction orthogonal to said one direction is b, an expression a:b=N:1 results.

38. The display panel according to claim 37, wherein said display panel is a liquid crystal display panel.

39. A color display panel comprising a plurality of display pixels arranged in a matrix, each display pixel being to be viewed from N view points and including 3×N (N represents a natural number) number of three primary color sub-pixels, said display panel being further constructed such that when assuming a pitch of said sub-pixels arranged in one direction is a and a pitch of said sub-pixels arranged in a direction orthogonal to said one direction is b, an expression a:b=3×N:1 results.

40. The display panel according to claim 39, wherein said display panel is a liquid crystal display panel.

41. A color display panel comprising a plurality of display pixels arranged in a matrix, each display pixel being to be viewed from N view points and including 3×N (N represents a natural number) number of three primary color sub-pixels, said display panel being further constructed such that when assuming a pitch of said sub-pixels arranged in one direction is a and a pitch of said sub-pixels arranged in a direction orthogonal to said one direction is b, an expression a:b=N:3 results.

42. The display panel according to claim 41, wherein said display panel is a liquid crystal display panel.

43. An image display method, in which at the time of display of three-dimensional image, at least M×2 number of sub-pixels for two view points of left-eye and right eye in M×N (M represents a natural number and N represents a natural number not less than 2) number of sub-pixels for N view points included in each of a plurality of display pixels arranged in a matrix to constitute a display panel, display images with parallax and a lenticular lens distributes light rays emitted from said sub-pixels for two view points individually to said view points; and at the time of display of two-dimensional image, said sub-pixels for two view points of left eye and right eye display images without parallax, said M×N number of sub-pixels included in each of said display pixels being formed within a square area.

44. An image display method, in which at the time of display of three-dimensional image, at least M×2 number of sub-pixels for two view points of left-eye and right eye in M×N (M represents a natural number and N represents a natural number not less than 2) number of sub-pixels for N view points included in each of a plurality of display pixels arranged in a matrix to constitute a display panel, display images with parallax and a parallax barrier distributes light rays emitted from said sub-pixels for two view points individually to said view points; and at the time of display of two-dimensional image, said sub-pixels for two view points of left eye and right eye display images without parallax, said M×N number of sub-pixels included in each of said display pixels being formed within a square area.

* * * * *

UNITED STATES PATENT AND TRADEMARK OFFICE
CERTIFICATE OF CORRECTION

PATENT NO. : 7,705,844 B2
APPLICATION NO. : 10/787101
DATED : April 27, 2010
INVENTOR(S) : Shin-ichi Uehara, Naoyasu Ikeda and Nobuaki Takanashi It is certified that error appears in the above-identified patent and that said Letters Patent is hereby corrected as shown below:

Column 16, Line 45, delete "the distance B" and insert --the distance H--.

Column 20, Line 21, delete "a b=6:1" and insert --$\underline{a} : \underline{b} = 6 : 1$--.

Signed and Sealed this

Twenty-sixth Day of October, 2010

David J. Kappos
*Director of the United States Patent and Trademark Office*